(12) United States Patent
Shinohara et al.

(10) Patent No.: US 10,895,759 B2
(45) Date of Patent: Jan. 19, 2021

(54) OPTICAL DEVICE AND METHOD OF THREE-DIMENSIONAL DISPLAY

(71) Applicant: OMRON Corporation, Kyoto (JP)

(72) Inventors: Masayuki Shinohara, Kyoto (JP); Yasuhiro Tanoue, Shiga (JP); Gouo Kurata, Hyogo (JP); Yoshihiko Takagi, Kyoto (JP); Tsuyoshi Arai, Shiga (JP); Norikazu Kitamura, Osaka (JP); Mitsuru Okuda, Aichi (JP); Takahiro Morichi, Shiga (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 16/309,830

(22) PCT Filed: Jun. 16, 2017

(86) PCT No.: PCT/JP2017/022342
§ 371 (c)(1),
(2) Date: Dec. 13, 2018

(87) PCT Pub. No.: WO2018/012198
PCT Pub. Date: Jan. 18, 2018

(65) Prior Publication Data
US 2019/0179161 A1   Jun. 13, 2019

(30) Foreign Application Priority Data
Jul. 15, 2016   (JP) .................................. 2016-140197

(51) Int. Cl.
*G02B 30/56*   (2020.01)
*G03B 35/18*   (2006.01)
(Continued)

(52) U.S. Cl.
CPC ................ *G02B 30/56* (2020.01); *F21S 2/00* (2013.01); *G02B 5/00* (2013.01); *G02B 6/0035* (2013.01);
(Continued)

(58) Field of Classification Search
CPC ..... G02B 27/22; G02B 27/2292; G09F 13/18; G03B 35/18
See application file for complete search history.

(56) References Cited

U.S. PATENT DOCUMENTS 6,796,669 B2 * 9/2004 Masuda ............... G02B 6/0035
362/23.15
2001/0022562 A1   9/2001 Ishikawa
(Continued)

FOREIGN PATENT DOCUMENTS

CN   1093814 A    10/1994
CN   101290428 A  10/2008
(Continued)

OTHER PUBLICATIONS

International Search Report issued in Application No. PCT/JP2017/022342, dated Sep. 5, 2017 (2 pages).
(Continued)

*Primary Examiner* — Zheng Song
(74) *Attorney, Agent, or Firm* — Osha Bergman Watanabe & Burton LLP

(57) ABSTRACT

An optical device includes a planar-image forming unit configured to emit light that forms a planar image of a predetermined shape in a space, and an outline-image forming unit configured to emit light that forms an outline image with a light intensity different from the light intensity of the planar image at the outer-edge region of the planar image.

15 Claims, 54 Drawing Sheets

(51) Int. Cl.
- *G02B 5/00* (2006.01)
- *G09F 13/18* (2006.01)
- *G09F 19/12* (2006.01)
- *F21S 2/00* (2016.01)
- *G02B 30/00* (2020.01)
- *F21V 8/00* (2006.01)

(52) U.S. Cl.
CPC ............. *G02B 30/00* (2020.01); *G03B 35/18* (2013.01); *G09F 13/18* (2013.01); *G09F 19/12* (2013.01)

(56) References Cited

U.S. PATENT DOCUMENTS

| | | | |
|---|---|---|---|
| 2004/0217920 A1 | 11/2004 | Ishikawa | |
| 2009/0073721 A1* | 3/2009 | Kamikatano | G02B 6/0076 362/616 |
| 2009/0180296 A1 | 7/2009 | Chen et al. | |
| 2009/0310231 A1 | 12/2009 | Maekawa | |
| 2011/0047840 A1* | 3/2011 | Ou | G09F 13/18 40/546 |
| 2011/0128555 A1 | 6/2011 | Rotschild et al. | |
| 2011/0187832 A1 | 8/2011 | Yoshida | |
| 2011/0241573 A1* | 10/2011 | Tsai | G02B 6/0036 315/312 |
| 2012/0099343 A1* | 4/2012 | Ender | G02B 6/0036 362/613 |
| 2012/0162996 A1 | 6/2012 | Ikeda | |
| 2013/0293939 A1 | 11/2013 | Rotschild et al. | |
| 2013/0329432 A1* | 12/2013 | Parker | A61M 21/02 362/257 |
| 2014/0033052 A1 | 1/2014 | Kaufman et al. | |
| 2014/0126239 A1* | 5/2014 | Huang | F21V 7/04 362/609 |
| 2014/0268327 A1 | 9/2014 | Dunn et al. | |
| 2014/0293759 A1* | 10/2014 | Taff | G02B 5/1819 368/239 |
| 2014/0300840 A1 | 10/2014 | Fattal et al. | |
| 2016/0033706 A1 | 2/2016 | Fattal et al. | |
| 2016/0077489 A1 | 3/2016 | Kaufman et al. | |
| 2016/0139321 A1* | 5/2016 | Tsai | G02B 6/0068 362/607 |
| 2017/0090420 A1 | 3/2017 | Rotschild et al. | |
| 2018/0045970 A1* | 2/2018 | Shinohara | H04N 13/363 |

FOREIGN PATENT DOCUMENTS

| | | | |
|---|---|---|---|
| CN | 101488304 A | 7/2009 | |
| CN | 201994026 U | 9/2011 | |
| CN | 102356420 A | 2/2012 | |
| CN | 104335100 A | 2/2015 | |
| EP | 242312 A1 | 10/1987 | |
| JP | S62-242548 A | 10/1987 | |
| JP | H07-92426 A | 4/1995 | |
| JP | 2001-255493 A | 9/2001 | |
| JP | 2005-99425 A | 4/2005 | |
| JP | 2006-243089 A | 9/2006 | |
| JP | 2006-330015 A | 12/2006 | |
| JP | 2008-158114 A | 7/2008 | |
| JP | 2010-206362 A | 9/2010 | |
| JP | 2011-175297 A | 9/2011 | |
| JP | WO2010/007787 A1 | 1/2012 | |
| JP | 2012-028871 A | 2/2012 | |
| JP | 2012-118378 A | 6/2012 | |
| JP | 2014-178652 A | 9/2014 | |
| JP | 5861797 B1 | 2/2016 | |
| JP | 2016-035580 A | 3/2016 | |
| JP | 2016-516176 A | 6/2016 | |
| WO | WO 2014120194 * | 1/2013 | ............. G02B 27/22 |

OTHER PUBLICATIONS

Written Opinion issued in International Application No. PCT/JP2017/022342, dated Sep. 5, 2017 (4 pages).

National Institute of Advanced Industrial Science and Technology: Ku Chu Ni Ukabi Agaru Sanjigen (3D) Eizo, Projecting a Three-dimensional (3D) Image in Space, https://www.aist.go.jp/Portals/0/resource_images/aist_j/aistinfo/aist_today/vol06_04/vol06_04_p16_19.pdf, Apr. 2006 (12 pages).

Office Action in counterpart Japanese Patent Application No. 2016-140197 dated Sep. 3, 2019 (6 pages).

Japanese Office Action in corresponding Application No. 2016-140197 dated Oct. 23, 2019 (6 pages).

Office Action in counterpart Chinese Patent Application No. 201780035526.5 dated Jul. 9, 2020 (17 pages).

V. Wang; "Research on High Efficiency Integrated Display Device and Its Applications"; PhD. Dissertation submitted to Shanghai Jiao Tong University for the Degree of Philosophy Doctor; Dec. 31, 2015 (170 pages).

* cited by examiner

| | Planar Image | Outline Image |
| --- | --- | --- |
| | First Optical-path Deflectors | Second Optical-path Deflectors |
| Example 1 |  |  |
| Example 2 |  |  |

FIG. 14

| | Planar Image | Outline Image |
|---|---|---|
| | First Optical-path Deflectors | First Optical-path Deflectors |
| Example 3 | 21a P21a 21b P21b 21c P21c | 21a P21a 21b P21b 21c P21c |
| Example 4 | P21a  P21b  P21c | 21a P21a 21b P21b 21c P21c |
| Example 5 | Outline — P21a — Plane | |
| Example 6 | P21a | P21a  21a |

FIG. 15

| | Planar Image | Outline Image |
|---|---|---|
| | Parallax Image | Parallax Image |
| Example 7 | P22, 22, P22a (letter A filled) | P22, 22, P22a (letter A outline) |
| Example 8 | P21a, 21a (curved shape) | P21a, 21a (rectangle) |
| Example 9 | P21a, 21a (small rectangle) | P21a, 21a (rectangle) |

OPTICAL DEVICE AND METHOD OF THREE-DIMENSIONAL DISPLAY

BACKGROUND

Field

The present invention relates to an optical device that presents a stereoscopic image, and to a method of three-dimensional display.

Related Art

The image display device disclosed in Japanese Patent Publication No. 2012-118378 (published Jun. 21, 2012) provides one example of a known optical device that presents a stereoscopic image.

Japanese Patent Publication No. 2012-118378 discloses an image display device 100 equipped with a light guide plate 110 and a light source 101 provided at an end of the light guide plate 110. Left-eye display patterns 111a, 112a, 113a having a plurality of first prisms and right-eye display patterns 111ba, 112ba, 113ba having a plurality of second prisms are formed on the rear surface of the light guide plate 110 (FIG. 30A). As illustrated in FIG. 30B, the aforementioned left-eye display patterns 111a use a plurality of prisms P1 to create a two dimensional planar "A", and the right-eye display patterns 111b use a plurality of prisms P2 to create a two-dimensional planar "A".

In this configuration, the plurality of first and second prisms reflect light from the light source 101 to thereby present a left-eye image and a right-eye image on the surface of the light guide plate 110. When the observer views the left-eye image and the right-eye image, the observer perceives each of the observed images 120 of "A", "B", and "C" as planar images that appear three-dimensional and arranged in that order from furthest to nearest as illustrated in FIG. 30C. The observed images 120 are perceived as floating at the intersection of the optical paths of the light rays from the left-eye images and right-eye images; therefore, the observed images with larger intervals have intersection points closer to the observer and thus appear even closer to the observer. Accordingly, the observer is able to perceive a natural three-dimensional presentation.

SUMMARY

However, in the aforementioned conventional image display device 100, the stereoscopic image formed in space is merely a planar image; therefore, the boundary between the planar image and the space is not clear, making it difficult to perceive the three dimensionality of the image.

One or more embodiments of the present invention provides an optical device that facilitates perception of three dimensionality and a method of three-dimensional display.

An optical device according to an aspect of the present invention is provided with a planar-image forming unit that emits light that forms a planar image of a predetermined shape in a space, and an outline-image forming unit that emits light that forms an outline image with a different light intensity than the planar image at the outer-edge region of the planar image.

A method of three-dimensional display according to an aspect of the present invention involves forming a planar image of a predetermined shape in a space, and forming an outline image with a different light intensity than the planar image at the outer-edge region of the planar image.

One aspect of the present invention provides for an optical device that facilitates the perception of three dimensionality, and a method of three-dimensional display.

BRIEF DESCRIPTION OF THE DRAWINGS

FIG. 14 illustrates an example of arrangement when a group of first optical path deflectors is used either for forming a planar image or an outline image;

FIG. 15 illustrates an example of arrangement when a group of third optical path deflectors is used either for forming a planar image or an outline image;

DETAILED DESCRIPTION

Embodiments of the present invention are described below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment

An embodiment of the present invention is described below with reference to FIG. 1 through FIG. 16.

Configuration of the Optical Device

Figure 1:
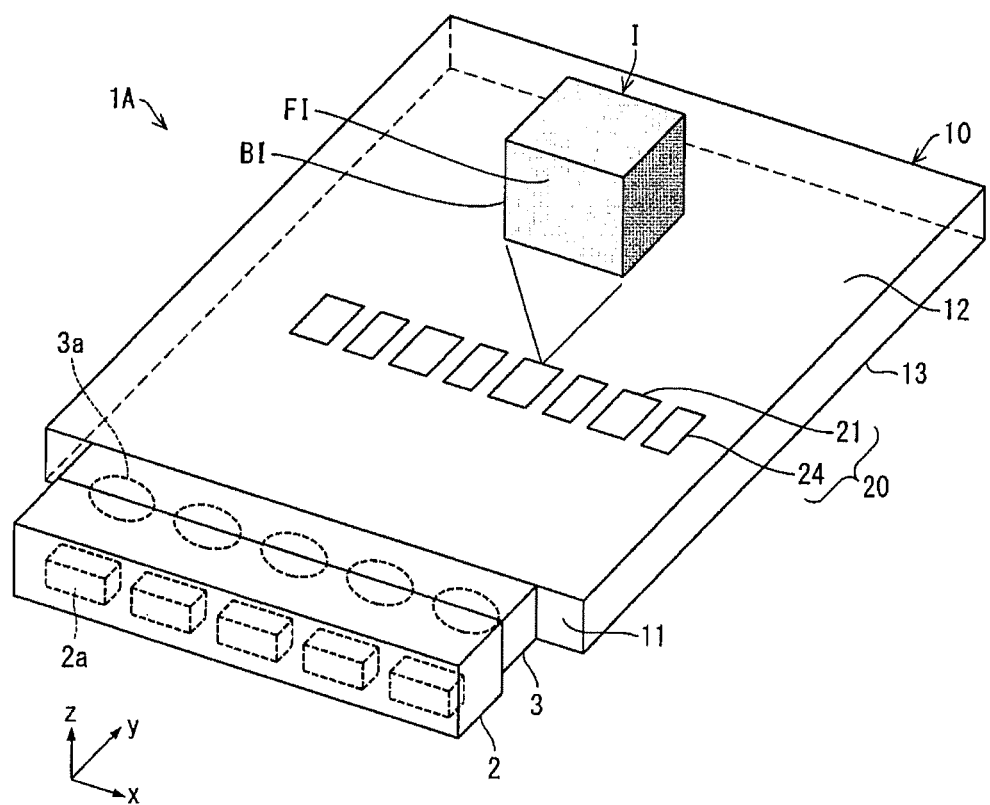
FIG. 1 illustrates an embodiment of an optical device according to the invention and is a perspective view presenting a configuration of the optical device.
Figure 2:
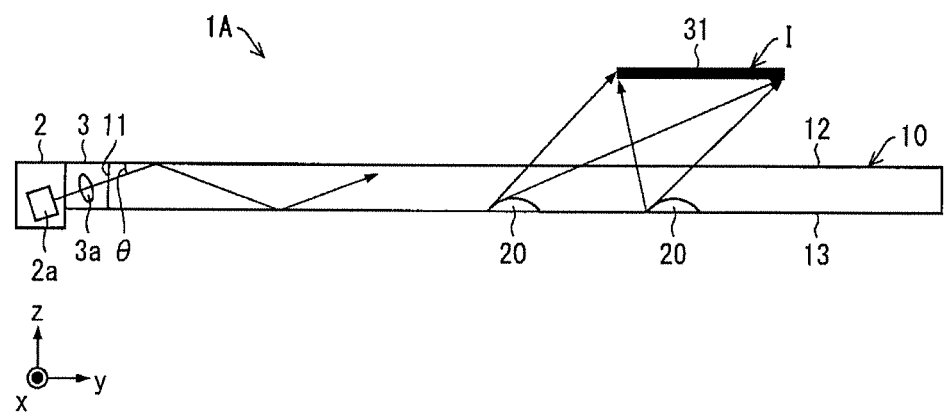
FIG. 2 is a cross-sectional view illustrating a configuration of the optical device.

The configuration of an optical device 1A according to the embodiment is described on the basis of FIG. 1 and FIG. 2. FIG. 1 is a perspective view illustrating a configuration of an optical device 1A according to the embodiment; FIG. 2 is a cross-sectional view illustrating a configuration of the optical device 1A.

As illustrated in FIG. 1, the optical device 1A of the embodiment is equipped with a plurality of optical-path deflectors 20 which can function as a planar-image forming unit and an outline-image forming unit. The plurality of optical-path deflectors 20 is arranged on the light guide plate 10 which directs the light entering therein from the light source 2 and emits the light from an emission surface 12. The optical-path deflectors 20 change the optical path of light guided thereto causing light to exit therefrom and form a stereoscopic image I in a space. The plurality of optical-path deflectors 20 further include a group of planar-image optical-path deflectors 21 that function as the planar-image forming unit, and a group of outline-image optical-path deflectors 24 that function as the outline-image forming unit. The planar-image optical-path deflectors 21 change the optical path of light directed thereto causing the light to exit therefrom and form a planar image FI in a space; and, the outline-image optical-path deflectors 24 change the optical path of light directed thereto causing the light to exit therefrom and form an optical and outline image BI in a space.

The light source 2 may be configured from a plurality of light emitting diodes (LED 2a). The light emitted from each of the light emitting diodes (LED 2a) is modified by a light-incidence tuning portion 3 and enters the incidence surface 11 of the light guide plate 10. Note that while in this embodiment, the light source 2 is made up of, for example, a plurality of light emitting diodes (LED 2a), the light source 2 is not limited thereto, and may be constituted by a single light emitting diode (LED 2a) or the like. The single light emitting diode (LED 2a) may be provided on at a side surface opposite the incidence surface 11.

The light-incidence tuning portion 3 is provided with a plurality of lenses 3a which correspond individually to the light emitting diodes (LED 2a). Each of the lenses 3a may reduce, increase, or change the spread of light emitted from the corresponding light emitting diode (LED 2a) along the optical axis thereof in the xy plane (later described). As a result, a lens 3a may cause light emitted from the light emitting diode (LED 2a) to approach parallel light, or direct the light to all regions inside the light guide plate 10. The spread angle of light directed by the light guide plate 10 is no greater than 5° and is preferably less than 1°. Note that other configurations may be used to reduce the spread angle of light within the xy plane; for example, the light-incidence tuning portion 3 may possess a mask having a window that is less than a predetermined width in the x axis direction.

Here, the optical axis of light emitted from the light emitting diodes (LED 2a) in this embodiment has an angle θ relative to the emission surface 12 (later described) as illustrated in FIG. 2. For example, the angle θ, which is an acute angle between the optical axis of the light emitted from the light emitting diode (LED 2a) and the emission surface, is roughly 20°. Therefore, even if the light entering the light guide plate 10 is almost parallel light, it is possible to increase the amount of light that repeatedly reflects between the emission surface 12 and the rear surface 13 (later described) and is directed through the light guide plate 10 compared to when the optical axis of incident light is parallel to the y axis. Consequently, it is possible to increase the light intensity of light entering the later-described optical-path deflectors 20 compared to when the optical axis of the incident light is parallel to the y axis.

The light guide plate 10 is produced from a transparent resin material with a relatively high index of refraction. The light guide plate 10 may be produced from, for instance, a polycarbonate resin (PC), a poly methyl methacrylate resin (PMMA), glass or the like.

The light guide plate 10 includes an incidence surface 11 where light from the light source 2 enters, an emission surface 12 which the front surface of the light guide plate 10 and wherefrom light exits, and a rear surface 13 whereon optical-path deflectors 20 are formed.

In this embodiment, light exits from the emission surface 12 of the light guide plate 10 and said emission of light forms a stereoscopic image I in a space. An observer recognizes the stereoscopic image I as three-dimensional. Note that the stereoscopic image I may also be perceived to exist at a location that is different from the emission surface 12 of the light guide plate 10. The stereoscopic image I may also perceived as a two-dimensional image in a location away from the emission surface 12 of the light guide plate 10. In other words, the stereoscopic image I may not only be recognized as having a solid shape, but may also include the concept of images having two-dimensional form that are perceived in a location different from the optical device 1A. The stereoscopic image I in this embodiment is described as located further along the positive z axis than the emission surface 12. However, there are cases where stereoscopic image I may also be located further along the negative z axis than the emission surface 12.

Note that a rectangular coordinate system of x axis, y axis, and z axis is used at times in describing this embodiment. In this embodiment, the z axis direction is defined as a direction perpendicular to the emission surface 12, where the positive Z axis is from the rear surface 13 toward the emission surface 12. The y axis direction is defined as perpendicular to the incidence surface 11 where the positive y axis direction is from the incident surface 11 toward a planar image FI facing the incident surface 11. Further, the x axis is along a direction orthogonal to the incident surface 11 along a lateral surface of the light guide plate 10, where the positive x axis direction is from the left side surface toward the right side surface in FIG. 1. To avoid redundancy in the description, planes parallel to the xy, yz, and xz planes are sometimes referred to as the xy plane, yz plane, and the xz plane, respectively.

The optical device 1A in this embodiment includes a plurality of optical-path deflectors 20 on the rear surface 13 of the light guide plate 10. The optical-path deflectors 20 change the optical path of light directed thereto by the light guide plate 10 causing the light to exit therefrom and from a stereoscopic image I in a space. The plurality of optical-path deflectors 20 are positioned in a matrix in the xy plane with each deflector arranged to dimensionally at a different location. The optical path deflectors 20 may be prisms.

That is, as above described the light emitted from light source 2 is modified by a light-incidence tuning portion 3 and enters the incidence surface 11 of the light guide plate 10. The light entering the light guide plate 10 is totally reflected between the emission surface 12 and the rear surface 13 of the light guide plate 10 and is directed to the farther end of the light guide plate 10. The optical-path deflectors 20 deflects the optical path of light that does not satisfy the conditions for total reflection toward a specific orientation and causes that light to exit from the emission surface 12.

The optical device 1A in this embodiment produces a stereoscopic image I created from a planar image FI that forms a predetermined shape in a space, and an outline image BI that form an outline region for the outer-edge region of the planar image FI as illustrated in FIG. 1. The light intensity of the planar image FI and the outline image BI are mutually different.

The optical device 1A in this embodiment in particular produces an outline image BI that is made up of line images LI.

Described below is the configuration and function of the group of first optical-path deflectors 21a, 21b, 21c, ... as the planar-image optical-path deflectors 21, and the group of second optical-path deflectors 25 as the outline-image optical-path deflectors 24. The group of first optical-path deflectors 21 form the planar image FI, and group of second optical-path deflectors 25 form the line images LI which serve as the outline image BI.

Configuration for Forming a Planar Image

Figure 3:
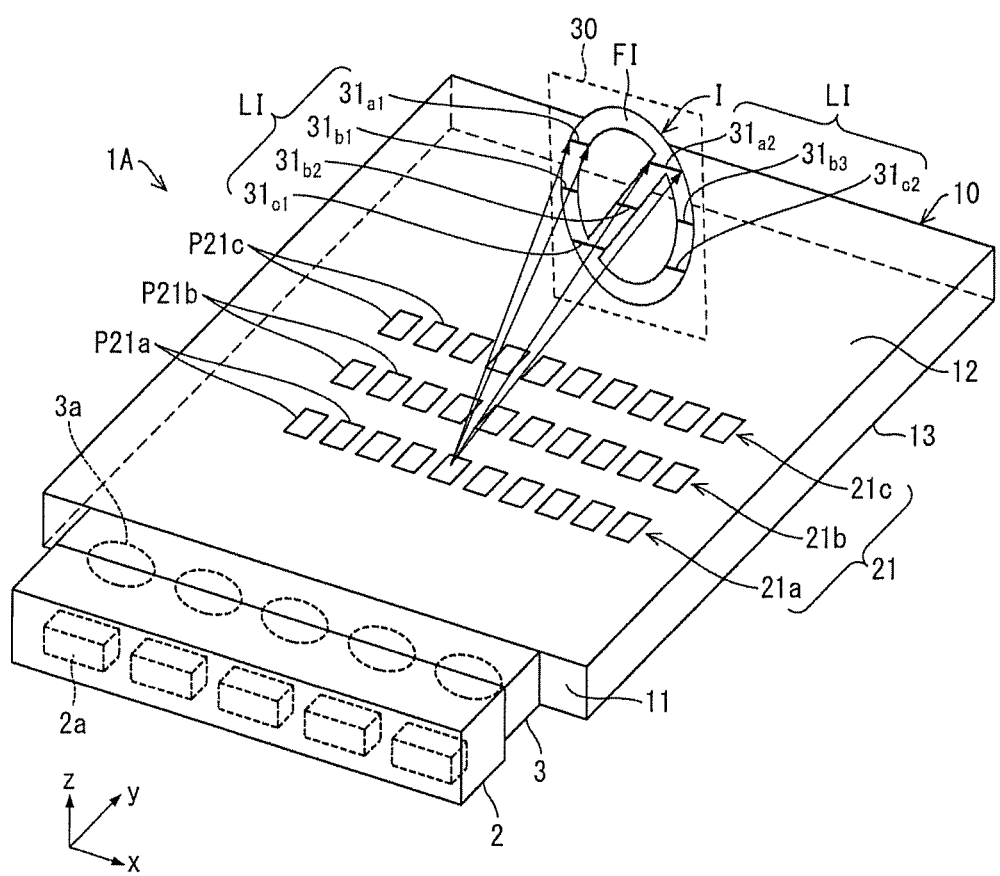
FIG. 3 is a perspective view of the configuration within the optical device for forming a planar image.
Figure 4:
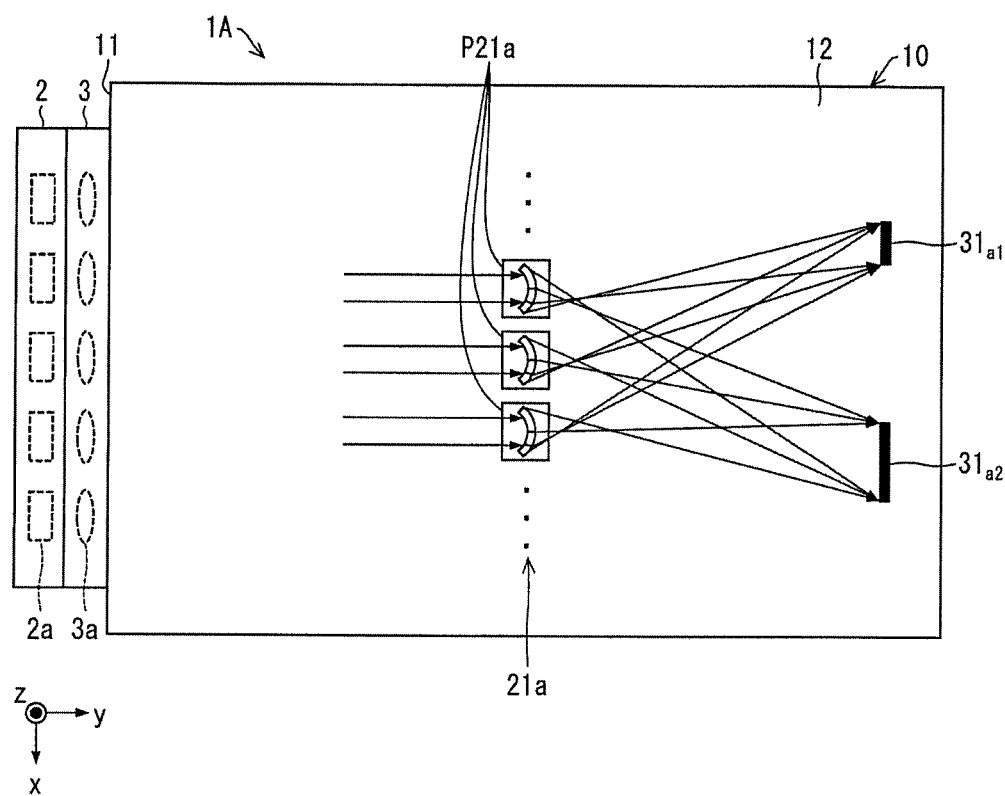
FIG. 4 is a plan view of the configuration within the optical device for forming a planar image.
Figure 5:
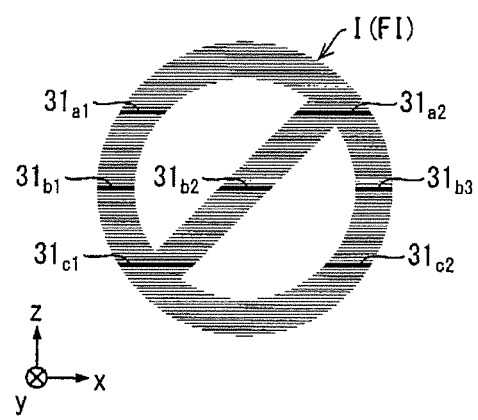
FIG. 5 is a front view illustrating an example of a stereoscopic image made up of a planar image formed by the optical device.

First, the configuration of the optical device 1A in the present embodiment for forming a planar image FI is described below on the basis of FIG. 3 through FIG. 5. FIG. 3 is a perspective view of the configuration within the optical device for forming a planar image FI; FIG. 4 is a plan view of the configuration within the optical device for forming a planar image FI; and FIG. 5 is a front view illustrating an example of a stereoscopic image I made up of a planar image FI formed by the optical device.

Assume, for example, that the optical device 1A produces a stereoscopic image I in a stereoscopic image forming plane that is parallel to the xz plane as illustrated in FIG. 3; and more specifically, that the optical device 1A forms a planar image FI as a circle with a diagonal line therethrough.

Preferably the optical device 1A ensures the light propagating through the light guide plate 10 spreads widely in the yz plane. Therefore, the light-incidence tuning portion 3 does not reduce the spread angle of light from the light source 2 in the yz plane. That is, the light-incidence tuning portion 3 does not affect the spread angle of light from the light source 2 in the yz plane for the most part.

For example, the lens 3a in the light-incidence tuning portion 3 may be a convex cylindrical lens that is curved in the xy plane and has essentially no curve in the yz plane. For example, both surfaces of the cylindrical lens may be convex.

A plurality of groups of first optical-path deflectors $21a$, $21b$, $21c$, . . . is formed on the rear surface 13 of the light guide plate 10 in the optical device 1A; the groups of first optical-path deflectors serve as the group of planar-image optical-path deflectors 21. Each group of the first optical-path deflectors $21a$, $21b$, $21c$, . . . are formed from a plurality of prisms provided along a direction parallel to the x axis. For example, the group of first optical-path deflectors $21a$ is made up of a plurality of prisms $P21a$. Similarly, the group of first optical-path deflectors $21b$ is made up of a plurality of prisms $P21b$, and the group of first optical-path deflectors $21c$ is made up of a plurality of prisms $P21c$.

For example, the prisms $P21a$ changes the path of incident light, spreading the light in a direction parallel to the xy plane, and causing the light to exit from the emission surface 12. The light beams emitted from the emission surface 12 due to the prisms $P21a$ are, for the most part, a line intersecting with the stereoscopic image forming plane 30. As illustrated in FIG. 3 and FIG. 4, the prisms $P21a$ cause the light beams to exit from the emission surface 12. The two light beams emitted intersect with the stereoscopic image forming plane 30 at line $31a1$ and line $31a2$. As illustrated in FIG. 3, any of the prisms $P21a$ included in the group of first optical-path deflectors $21a$ and other prisms $P21a$ therein similarly cause light beams to exit from the emission surface 12 and intersect with the stereoscopic image forming plane 30 at the line $31a1$ and the line $31a2$. The line $31a1$ and the line $31a2$ are substantially within a plane parallel to the xy plane, and form a portion of the stereoscopic image I. Thus, light from the multiple prisms $P21a$ belonging to the group of first optical-path deflectors $21a$ form the line $31a1$ and the line $31a2$ in the line image LI. The light forming the images of the line $31a1$ and the line $31a2$ may be provided by at least two prisms $P21a$, $P21a$ located at different positions along the x axis direction in the group of first optical-path deflectors $21a$.

That is, the plurality of prisms $P21a$ belonging to the group of first optical-path deflectors $21a$ causes light incident thereon to spread along the x axis direction within a plane parallel to the emission surface 12; the plurality of prisms $P21a$ causes light having an intensity distribution according to the images of the line $31a1$ and the line $31a2$ to exit from the emission surface 12. Hereby, the light from the plurality of prisms $P21a$ belonging to the group of first optical-path deflectors $21a$ and arranged along the x axis direction forms the image of the line $31a1$ and the line $31a2$.

As illustrated in FIG. 3, the prisms $P21b$ in the group of first optical-path deflectors $21b$ similarly changes the optical path of light incident thereon, spreads the light in a direction parallel to the xy plane, and causes three light beams to exit from the emission surface 12. The three light beams emitted from the emission surface 12 intersect with the stereoscopic image forming plane 30 at the line $31b1$, line $31b2$, and line $31b3$. Any of the prisms $P21b$ included in the group of first optical-path deflectors $21b$ and other prisms $P21b$ therein similarly cause light beams to exit from the emission surface 12 and intersect with the stereoscopic image forming plane 30 at the lines $31b1$, $31b2$, $31b3$. Therefore, the plurality of prisms $P21b$ belonging to the group of first optical-path deflectors $21b$ causes light incident thereon to spread within a plane parallel to the emission surface 12; the plurality of prisms $P21b$ causes light having an intensity distribution according to the images of the lines $31b1$, $31b2$, $31b3$ to exit from the emission surface 12. Hereby, light from the plurality of prisms $P21b$ belonging to the group of first optical-path deflectors $21b$ and arranged along the x axis direction is the light that forms the image of the lines $31b1$, $31b2$, $31b3$. The lines $31b1$, $31b2$, $31b3$ are substantially within a plane parallel to the xy plane, and form a portion of the stereoscopic image I.

Here, the lines $31b1$, $31b2$, $31b3$ and the lines $31a1$, $31a2$ are formed at different locations along the z axis direction in the stereoscopic image forming plane 30.

As illustrated in FIG. 3, the prisms $P21c$ in the group of first optical-path deflectors $21c$ similarly changes the optical path of light incident thereon, spreads the light in a direction parallel to the xy plane, and causes two light beams to exit from the emission surface 12. The two light beams emitted from the emission surface 12 intersect with the stereoscopic image forming plane 30 at the line $31c1$ and line $31c2$. Any of the prisms $P21c$ included in the group of first optical-path deflectors $21c$ and other prisms $P21c$ therein similarly cause light beams to exit from the emission surface 12 and intersect with the stereoscopic image forming plane 30 at the lines $31c1$, $31c2$. Therefore, the plurality of prisms $P21c$ belonging to the group of first optical-path deflectors $21c$ causes light incident thereon to spread within a plane parallel to the emission surface 12; the plurality of prisms $P21c$ causes the light having an intensity distribution according to the images of the lines $31c1$, $31c2$ to exit from the emission surface 12. Hereby, light from the plurality of prisms $P21c$ belonging to the group of first optical-path deflectors $21c$ and arranged along the x axis direction is the light that forms the image of the lines $31c1$, $31c2$. The lines $31c1$, $31c2$ are substantially within a plane parallel to the xy plane, and form a portion of the stereoscopic image I.

Here, the lines $31c1$, $31c2$, lines $31b1$, $31b2$, $31b3$, and lines $31a1$, $31a2$ are formed at different locations along the z axis direction in the stereoscopic image forming plane 30.

The locations the lines $31c1$, $31c2$, lines $31b1$, $31b2$, $31b3$, and lines $31a1$, $31a2$ are formed are at different locations along the z axis direction in the stereoscopic image forming plane 30, and are each perceived as separated in FIG. 3 as previously described. However, in reality, the groups of first optical-path deflectors $21a$, $21b$, $21c$, may be made up of more groups of first optical-path deflectors $21a$, $21b$, $21c$, . . . with a smaller gap between the groups of first optical-path deflectors $21a$, $21b$, $21c$, . . . in the y axis direction. Alternatively, the optical-path deflection angle may be selected for each of the prisms $P21a$, $P21b$, $P21c$ so that even if the groups of first optical-path deflectors $21a$, $21b$, $21c$, . . . are separated along the y axis direction, the lines $31a1$, $21a2$, lines $31b1$, $31b2$, $31b3$, and lines $31c1$, $31c2$ are formed at locations that are closer to each other along the z axis direction. Therefore, a planar image FI of a circle with diagonal line can be perceived as a stereoscopic image I as illustrated in FIG. 5.

Thus, the optical device 1A forms light beams into a planar image FI that is provided in a space near an observer by grouping light beams from each plurality of prisms $P21a$, $P21b$, $P21c$ in the groups of first optical-path deflectors $21a$, $21b$, $21c$, . . . which are arranged two-dimensionally. Therefore, an observer is able to recognize a stereoscopic image I constituted from a planar image FI over a wide range of positions along the y axis direction.

Shape of the First Optical-Path Deflectors for Forming the Planar Image

Figure 6:
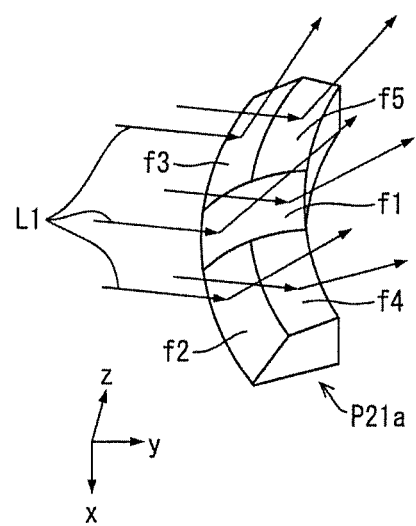
FIG. 6 is a perspective view of one example of configuring prisms in a light guide plate in the optical device for forming the planar image.
Figure 7A:
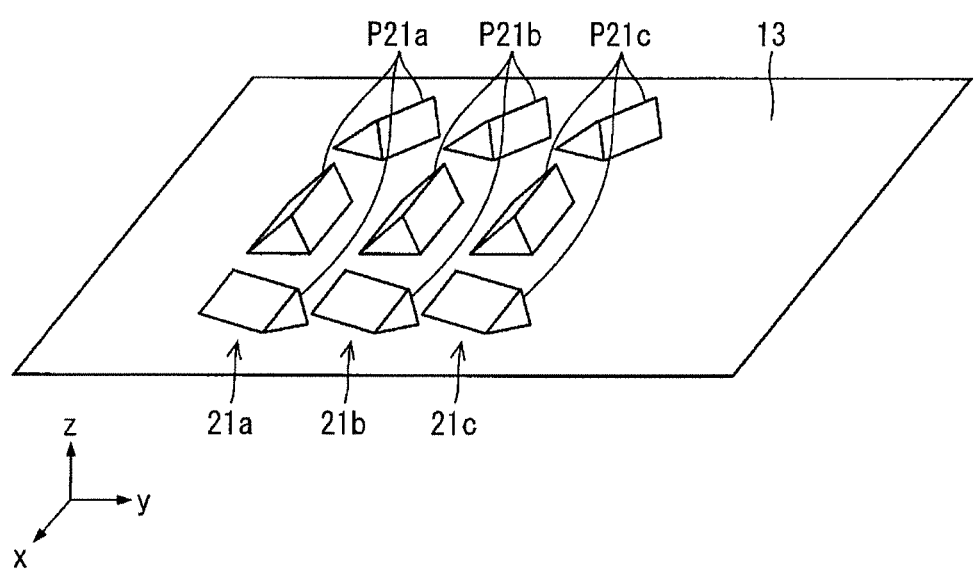
FIG. 7A is a perspective view illustrating an example of arranging the prisms in the light guide plate in the optical device.
Figure 7B:
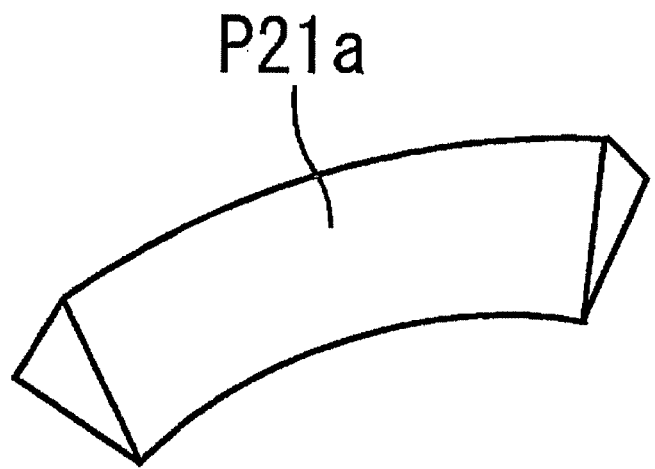
FIGS. 7B, 7C, and 7D are perspective views of modifications to the configuration of the prisms.
Figure 7C:
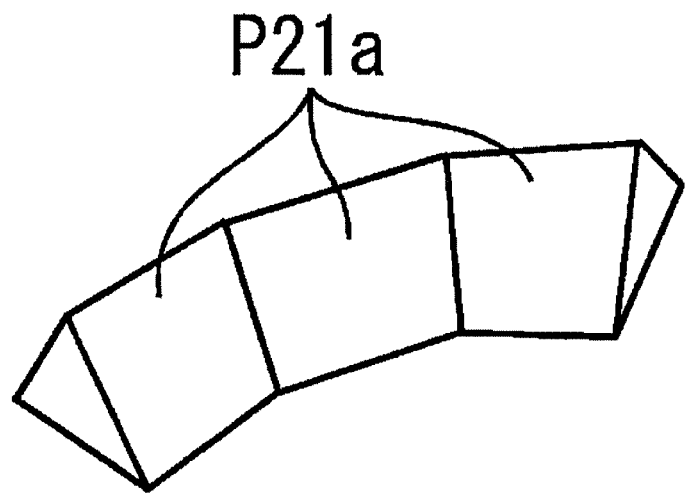
Figure 7D:
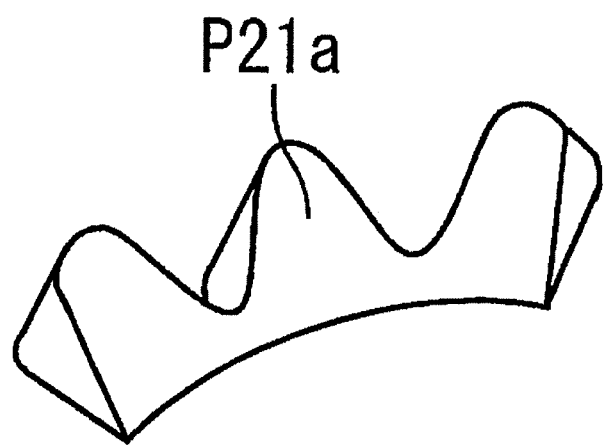
Figure 8A:
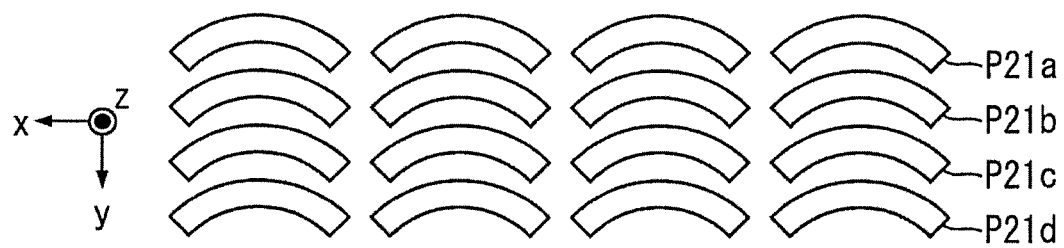
FIGS. 8A, 8B, and 8C are plan views illustrating examples of prisms in the light guide plate in the optical device for forming the planar image.
Figure 8B:
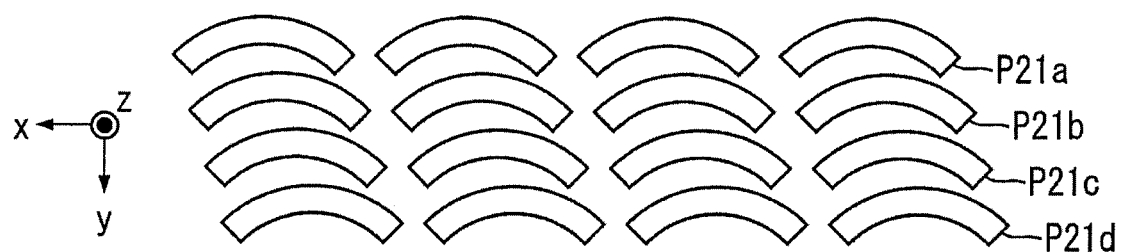
Figure 8C:
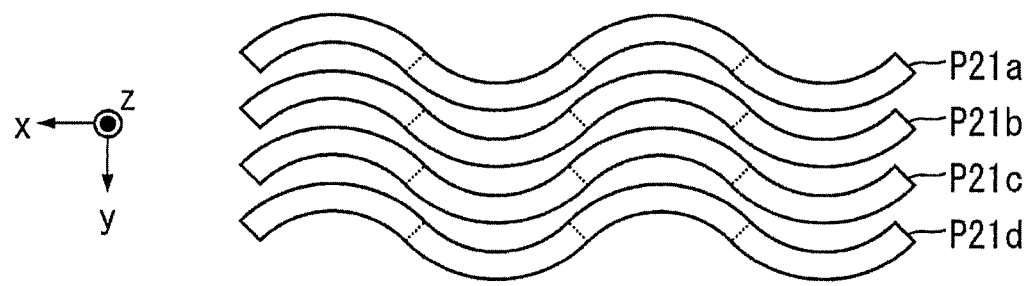

The shape of the prisms $P21a$, $P21b$, $P21c$ in the groups of first optical-path deflectors $21a$, $21b$, $21c$, . . . for forming the planar image FI is described on the basis of FIG. 6 through FIG. 8. FIG. 6 is a perspective view of one example of configuring prisms P21a in the light guide plate 10 in the optical device 1A for forming the planar image; FIG. 7A is a perspective view illustrating an example of arranging the prisms P21a in the light guide plate 10 in the optical device 1A; FIGS. 7B, 7C, and 7D are perspective views of modifications to the configuration of the prisms P21a; and FIGS. 8A, 8B, and 8C are plan views illustrating examples of prisms P21a-P21d in the light guide plate 10 in the optical device 1A for forming the planar image.

As illustrated in FIG. 6, the prisms P21a in the group of first optical-path deflectors 21a may have a truncated mountain cross-section and include, for example, reflection surfaces f1, f2, f3, f4, f5. The reflection surfaces f1, f2, f3, f4, f5 are one example of an optical surface that function as a deflection surface, changing the optical path of light. The reflection surfaces f1, f2, f3, f4, f5 are curves oriented in mutually different directions. As above described, the optical axis of the light emitting diodes (LED 2a) in this embodiment is inclined within the yz plane at no more than an angle θ with the emission surface 12 of the light guide plate 10. Therefore, even if the light entering the light guide plate 10 is almost parallel light it is possible to increase the amount of light that repeatedly reflects between the emission surface 12 and the rear surface 13 and is directed through the light guide plate 10 compared to when the optical axis of incident light is parallel to the y axis. Accordingly, the reflection surfaces f1, f2, f3, f4, f5 can increase the amount of incident light compared to when the optical axis of the incident light is parallel to the y axis.

The aforementioned reflection surface f1 is an arced, upwardly sloping, inclined surface that is curved in a direction parallel to light L1 guided by the light guide plate 10; the light L1 incident on the reflection surface f1 exits from the emission surface 12 at a different emission angle depending on the location the light L1 is incident on the reflection surface f1. As a result, the reflection surface f1 increases the range of the light L1 incident thereon along, for instance, an area 31 of the stereoscopic image I, as illustrated in FIG. 2. In this embodiment the area 31 is an area parallel to the y axis. The light reflecting from the reflection surface f1 is oriented from the reflection surface f1 toward where the area 31 exists, and essentially no light reflected from the reflection surface f1 travels toward where the area 31 does not exist. Accordingly, the light reflected from the reflection surface f1 is substantially distributed only at angles within the yz plane from the reflection surface f1 toward the area 31. Thus, the reflection surface f1 modulates the intensity of light incident thereon in the yz plane in an angular direction and outputs said light. Because the reflection surface f1 is curved, the reflection surface f1 is able to provide the light that draws the lines in the image, even if the light L1 which is incident on the reflection surface f1 is parallel light.

As illustrated in FIG. 6, the reflection surfaces f2, f3 in the prisms P21a are donut-like with a truncated mountain cross section; the reflection surfaces f2, f3 sandwich the reflection surface f1 and extend along the arc thereof. Each of the reflection surfaces f2, f3 are slanted surfaces that incline upwardly to a point, similarly to the reflection surface f1. As a result, the light L1 entering the reflection surfaces f2, f3 is reflected therefrom, and the reflection surfaces f2, f3 widens the range of the reflected light along the line 31a1 and the line 31a2 in the stereoscopic image I as illustrated in FIG. 3. Further, the reflection surface f1 ensures there are no lines between the line 31a1 and the line 31a2 in the stereoscopic image I as illustrated in FIG. 3.

As illustrated in FIG. 6, the reflection surfaces f4, f5 created from rising slanted surfaces formed passing through an inflection line partway along the reflection surfaces f4, f5. The presence of the reflection surfaces f4, f5 allow the line 31c1, and the line 31c2 to be created in the stereoscopic image I as illustrated in FIG. 3.

Thus, for example, through the shape of the reflection surfaces f1, f2, f3, f4, f5, the prisms P21a can create the lines 31, i.e., lines 31a1, 31a2, 31b1, 31b2, 31b3, 31c1, 31c2 which is base for creating the planar image FI in the stereoscopic image I.

The prisms P21a is depicted in FIG. 6 as a single that forms all the lines, i.e., lines 31a1, 31a2, 31b1, 31b2, 31b3, 31c1, 31c2 in the planar image FI. However, it tends to be more difficult to use a single prism to form all the shapes in the actual planar image FI.

Thus, for example, groups of first optical-path deflectors 21a, 21b, 21c, . . . may be provided from a plurality of prisms P21a . . . , prisms P21b . . . , and prisms P21c . . . , as illustrated in FIG. 7A.

The prisms P21a, 21b, 21c illustrated in FIG. 7A may be tetrahedral prisms arranged horizontally. However, the prisms are not limited to these shapes, and may be, for example arced tetrahedrons, arced tetrahedrons with an inflected section, or a partially corrugated arced tetrahedron as illustrated in FIG. 7B, 7C, 7D.

The plurality of prisms P21a . . . , prisms P21b . . . , prisms 21c . . . illustrated in FIG. 7A may be distributed in rows along the Y axis direction as illustrated in FIG. 8A. However, the prisms P21a . . . , prisms 21b . . . , prisms P21c . . . , and prisms 21d . . . are not limited to this kind of arrangement and may be distributed so that when viewed in order along the y axis direction, the prisms P21a . . . , prisms 21b . . . , and prisms 21c . . . , and prisms 21d . . . appear shifted by a fixed amount along the x axis direction. The prisms P21a, prisms 21b, prisms P21c, and prisms 21d may also be arcs that are arranged to appear as a wave.

Example of Modifying the Shapes of the First Optical-Path Deflectors for Forming the Planar Image To describe the shapes of the groups of first optical-path deflectors 21a, 21b, 21c, . . . used to form the planar image FI, the previous section describes the shapes of the prisms P21a, 21b, 21c that form the lines 31a1, 31a2, lines 31b1, 31b2, 31b3, and lines 31c1, 31c2 which are the basis of the planar image FI. However, the groups of first optical-path deflectors 21a, 21b, 21c, . . . used to form the planar image FI are not limited to these shapes. For instance, a prism P22 may be formed that matches the shape of the planar image FI. Providing a plurality of the prisms P22 make it possible for a group of third optical-path deflectors 22 to serve as a group of planar-image optical-path deflectors 21 that form the planar image FI.

Figure 9:
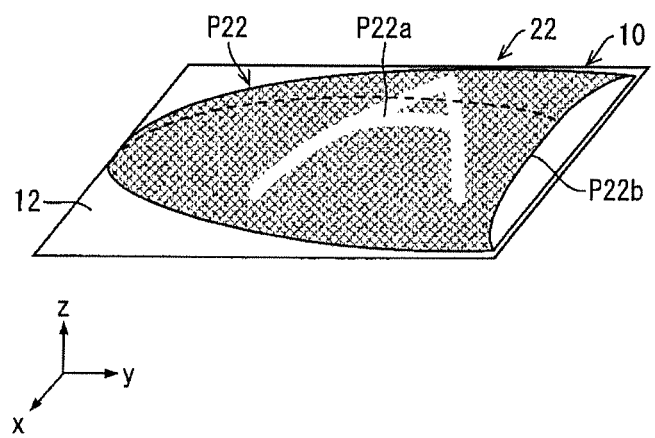
FIG. 9 is another example of modifying the prisms in the light guide plate in the optical device for forming the planar image and is a perspective view of the shapes of the prisms when the prisms form planar images as parallax images.

The shape of the prism P22, which represents a case where the shape of the prism forms the planar image FI without change, is described on the basis of FIG. 9. FIG. 9 is a perspective view illustrating the shape of a prism P22 that forms the planar image FI as a parallax image.

The prism P22 is a convex reflection surface and is formed on the rear surface 13 of the light guide plate 10. The convex reflection surface of the prism P22 is configured to change the optical path of light directed thereto in the light guide plate 10, and cause the light to exit from the emission surface 12 as light beams that pass through the stereoscopic image forming plane 30.

For example, the outer convex surface of the prism P22 is provided with a lettering portion P22a whereon a character "A" is formed, and outside the lettering portion P22a is an anti-reflective film portion P22b. Light entering the anti-reflective film portion P22b is does not reflect therefrom.

In contrast, the light entering the lettering portion P22a (e.g., for the letter 'A'), reflects therefrom. Thus, the prism P22 changes the optical path of light entering therein, and causes the light to exit from the emission surface 12 as light beams that pass through a stereoscopic image I of the letter A.

The anti-reflective film portion P22b may be created by coating the rear surface 13 of the light guide plate 10 except for the lettering portion P22a (e.g., for the letter 'A'), with black paint. The anti-reflective film portion P22b (e.g., for the letter 'A'), may also be created by printing with black paint and leaving out the lettering portion P22a.

Thus, the prism P22 may be printed with black paint after being formed as a convex shape on the rear surface 13 or the light guide plate 10 to thereby create the lettering portion P22a (e.g., for the letter 'A'). This facilitates manufacturing the prism P22.

For instance, creating a lettering portion P22a on the prism P22 (e.g., for the letter 'A'), in such a manner makes it possible to form a stereoscopic image I made up of a planar image FI using the parallax image technique proposed in Japanese Patent Publication No. 2012-118378.

Configuration for Forming a Line Image

As previously described, the stereoscopic image I in the optical device 1A in this embodiment is made up of a planar image FI that spreads two-dimensionally in a space, and a line image LI that makes up an outline image BI which functions as the outline of the planar image FI. The optical-path deflectors 20 are constituted by a group of first optical-path deflectors 21a, 21b, 21c, . . . which function as the planar-image optical-path deflectors 21 that form the planar image FI and a group of second optical-path deflectors 25 which function as the outline-image optical-path deflectors 24 that form the line images LI.

Figure 10:
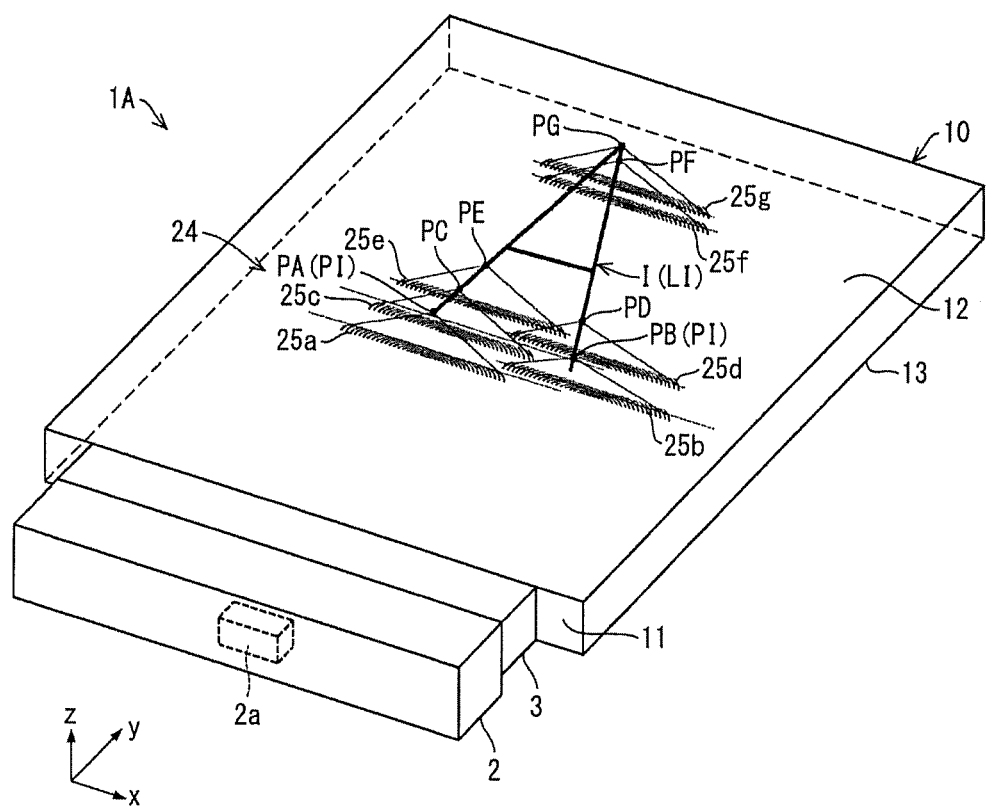
FIG. 10 is a perspective view illustrating a configuration of a group of second optical path deflectors in the optical device that form a line image.

A configuration of the group of second optical-path deflectors 25 that form the line image LI is described below on the basis of FIG. 10. FIG. 10 is a perspective view illustrating a configuration of a group of second optical-path deflectors 25 that form a line image LI.

Assume that a line images LI of the letter "A" is formed as the stereoscopic image I in a space.

In this case, light from the light source 2 enters the light guide plate 10, and a plurality of group of outline-image optical-path deflectors 24 are formed on the rear surface 13 of the light guide plate 10 in the optical device 1A in this embodiment; the group of outline-image optical-path deflectors 24 are constituted by groups of second optical-path deflectors 25a, 25b, 25c, 25d, 25e, 25f, 25g. Note that the light source 2 may be configured from a single light emitting diode (LED 2a); additionally, the light source 2 may be mounted at the end surface on the opposite end surface facing the incidence surface 11 of the light guide plate 10. That is, a light source 2 may be provided at the incidence surface 11 of the light guide plate 10 for forming the planar image FI, and another light source 2 may be provided at the end surface opposing the incidence surface 11 for forming the line image LI.

Portions of groups of second optical-path deflectors 25a-25g for forming the line image LI are formed from a Fresnel lens. The groups of second optical-path deflectors 25a-25g are formed continuously for the most part along the x axis direction.

There may be gaps provided between the plurality of refraction surfaces (prism surfaces) that function as the Fresnel lens in the groups of second optical-path deflectors 25a-25g. The light guide plate 10 guides light toward each location of a group of second optical-path deflectors 25a-25g along the x axis direction. The groups of second optical-path deflectors 25a-25g causes light incident thereon at the locations of the groups of second optical-path deflectors 25a-25g to substantially converge at a fixed point corresponding to each group of second optical-path deflectors 25a-25g. FIG. 10 illustrates the convergence of a plurality of light rays from the groups of second optical-path deflectors 25a-25g.

More specifically, the group of second optical-path deflectors 25a corresponds to a point image PI of a fixed point PA in the stereoscopic image I. The light rays from each position in the group of second optical-path deflectors 25a converge at the fixed point PA in the stereoscopic image I. Therefore, the optical wavefront from the group of second optical-path deflectors 25a appears as an optical wavefront that is radiating from the fixed point PA.

Next, the group of second optical-path deflectors 25b corresponds to a point image PI of a fixed point PB in the stereoscopic image I. The light rays from each position in the group of second optical-path deflectors 25b converge at the fixed point PB in the stereoscopic image I. Thus, the light rays from the locations of any desired groups of second optical-path deflectors 25a-25g converge at a fixed point corresponding to the groups of second optical-path deflectors 25a-25g. Hereby, any of the groups of second optical-path deflectors 25a-25g may present an optical wavefront that appears to radiate from a corresponding fixed point. The point images pi of the fixed points PA-PG corresponding to the groups of second optical-path deflectors 25a-25g are mutually different; additionally, grouping the plurality of fixed points PA-PG corresponding to the groups of second optical-path deflectors 25a-25g form the stereoscopic image I in a space. In this manner, the optical device 1A projects a stereoscopic image I in a space.

That is, the groups of second optical-path deflectors 25a-25g are formed closely along the y axis direction in the optical device 1A in this embodiment. As a result, the grouping of the plurality of fixed points PA-PG perceived by human eyes is substantially a line image LI in the stereoscopic image I.

Here, the light beams guided by the light guide plate 10 and passing through the locations in the light guide plate 10 in the xy plane have a spread angle about the direction connecting each location in the light guide plate and the light source 2 that is smaller than a predetermined value. Additionally, within a plane orthogonal to the xy plane and including a line connecting each location in the light guide plate 10 and the light source 10, the light beams guided by the light guide plate 10 and passing through the locations in the light guide plate 10 have a spread angle about the direction connecting each location in the light guide plate and the light source 2 that is smaller than a predetermined value. The groups of second optical-path deflectors 25a-25g may be provided at a location away from the light source 2; in this case the light beams guided by the light guide plate 10 an incident on the groups of second optical-path deflectors 25a-25g do not spread within the xy plane generally about the y-axis direction. Therefore, light from the groups of second optical-path deflectors 25a converge substantially on a single fixed point in a plane that includes the fixed point PA and is parallel to the xz plane.

Note that if the light incident on the groups of second optical-path deflectors 25a-25g spreads in the z axis direction, light from the groups of second optical-path deflectors 25a-25g converges along the y axis on a line in space that includes the fixed point as is later described. What is discussed here is the spread of light within the xy plane from the light incident on the groups of second optical-path deflectors 25a-25g and the convergence of light from the groups of second optical-path deflectors 25a-25g in the xy plane in particular; therefore, these concepts are presented as light from the groups of second optical-path deflectors 25a-25g converging on a fixed point.

As illustrated in FIG. 10, the group of second optical-path deflectors 25a is formed along a line. The group of second optical-path deflectors 25b is also formed along a line. The groups of second optical-path deflectors 25a, 25b are each formed on a straight line parallel to the x axis. Any of the groups of second optical-path deflectors 25a-25g are formed continuously for the most part along a straight line parallel to the x axis. Therefore, the groups of second optical-path deflectors 25a-25g are each formed with the length thereof perpendicular to the light guiding direction of the light guide plate 10 in a plane parallel to the emission surface 12.

Thus, the groups of second optical-path deflectors 25a-25g are each formed along a predetermined line within a plane parallel to the emission surface 12. Light guided by the light guide plate 10 is incident on each of the groups of second optical-path deflectors 25a-25g, and the groups of second optical-path deflectors 25a-25g cause emission light to exit from the emission surface 12 toward a direction substantially converging onto a single convergence point in a space. Note that when the fixed point is near the rear surface 13 of the light guide plate 13, the emission light radiates from the fixed point. Therefore, when the fixed point is near the rear surface 13 of the light guide plate 10, the reflection surfaces in the groups of second optical-path deflectors 25a-25g causes emission light to exit from the emission surface 12 in a direction so that the radiates, for the most part, from a single convergence point in a space.

Shape of the Second Optical-Path Deflectors for Forming the Line Image

Figure 11A:
FIG. 11A is a plan view illustrating a configuration of a group of second optical path deflectors in the optical device that form a line image; and 11B is a plan view illustrating an example of modifying the configuration of the group of second optical path deflectors in the optical device that form a line image.
Figure 11B:
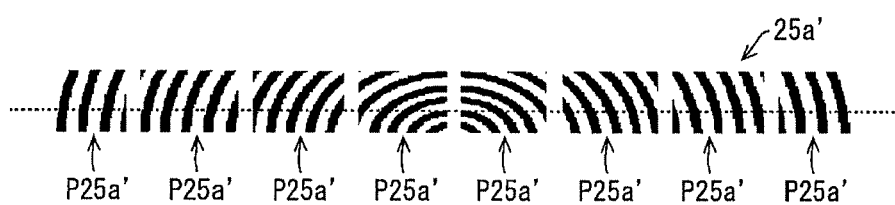
Figure 12:
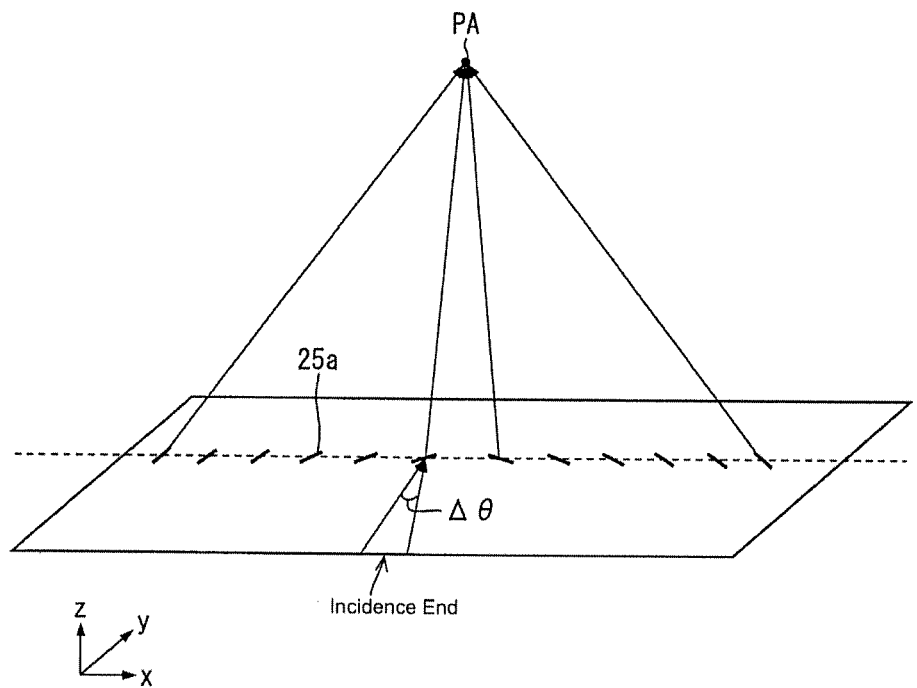
FIG. 12 is a perspective view illustrating a configuration of a group of second optical path deflectors in the optical device that form a line image.

The groups of second optical-path deflectors 25a, 25b, 25c, 25d, 25e, 25f, 25g in the optical device 1A of this embodiment are for forming a line image LI; the groups of second optical-path deflectors 25a, 25b, 25c, 25d, 25e, 25f, 25g are described on the basis of FIG. 11A, 11B, and FIG. 12. FIG. 11A is a plan view illustrating a configuration of a group of second optical path deflectors 25a in the optical device 1A for forming a line image LI; FIG. 11B is a plan view illustrating an example of modifying the group of second optical path deflectors 25a in the optical device 1A for forming a line image LI; and FIG. 12 is a perspective view illustrating the focusing of light from the group of second optical-path deflectors 25a shown in FIG. 11A.

As illustrated in FIG. 11A, each of the deflectors in the group of second optical-path deflectors 25a may form an image from a portion of a Fresnel lens. The group of second optical-path deflectors 25a may be concentric circles cut into bands. The group of second optical-path deflectors 25a thus configured is such that the radius of the center is greater than the radius at the ends for each of the deflectors in the group. As a result, the light entering at the center portion of the group of second optical-path deflectors 25a converges on the fixed point PA located directly thereabove as illustrated in FIG. 12 because the curvature is larger at the center portion of the group of deflectors. Whereas, the light entering at the ends of the group of second optical-path deflectors 25a refract to a large degree and converge on a fixed point directly above the center portion because the curvature is smaller at the end portions. Thus, the group of second optical-path deflectors 25a in this embodiment is configured so that all the prisms cause light to converge on the fixed point PA because prisms of different curvatures are on a straight line. A large amount of light converges on the fixed point PA because multiple prisms P25a cause light to converge thereat. Therefore, naturally, the actual line images LI produced from aligning the fixed points PA through PG exhibit a large amount of light.

Accordingly, the line images LI formed by the group of second optical-path deflectors 25a in the optical device 1A of this embodiment are clear and exhibit a large amount of light. Therefore, preferably the line images LI formed from the group of second optical-path deflectors 25 in this embodiment are used to outline the planar image FI formed by the group of first optical-path deflectors 21.

As illustrated in FIG. 11A, the lenses in the group of second optical-path deflectors 25a are placed at a fixed interval. However, the lenses are not limited to this placement. For example, the lenses in the group of second optical-path deflectors 25a may be placed partly at large intervals as illustrated in FIG. 11B.

That is, a group of second optical-path deflectors 25a' may be provided with a plurality of groups of lenses 25a' along the x axis direction as illustrated in FIG. 11B.

In contrast to having the optical surface change continuously lengthwise along the group of second optical-path deflectors 25a, the optical surfaces in the group of second optical-path deflectors 25a' change intermittently lengthwise along the group of second optical-path deflectors 25a' as with the plurality of groups of lenses P25a'. Thus, light from the groups of lenses in the group of second optical-path deflectors 25a' converge on the same fixed point PA to which the group of second optical-path deflectors 25a' corresponds. The light intensity distribution of the light from the groups of lenses P25a' along the x axis direction substantially peaks at the location of the fixed point PA and decreases sharply with distance from the fixed point PA.

In contrast, the optical surfaces of the group of second optical-path deflectors 25a may be formed continuously in the x axis direction without separation; in this case, the light from a section of the optical surfaces overlaps with a portion of light from optical surfaces surrounding that section. Therefore, the light from corresponding sections tend to have a broader intensity distribution compared to when the groups of lenses P25a' are provided with minute separations along the x axis direction. That is, the group of second optical-path deflectors 25a' may be partitioned into a plurality of groups of lenses P25a'. The width of the light intensity distribution of light from each of the groups of lenses P25a' may thus be reduced compared to when there is no separation. Thus, partitioning the group of second optical-path deflectors 25a' into a plurality of groups of lenses P25a' may result in the so-called black-matrix effect and increase the contrast of the image.

Instead of cylindrical Fresnel lens, a diffraction grating may be adopted for use as the group of second optical-path deflectors 25a and the group of second optical-path deflectors 25a'. A group of second optical-path deflectors 25a configured from prisms with reflection surfaces may server as the group of second optical-path deflectors 25a and the group of second optical-path deflectors 25a'.

Examples of Using Groups of First Optical-Path Deflectors and Groups of Second Optical-Path Deflectors to Form Planar Images and Line Images The optical deflector 1A in this embodiment combines a two-dimensional planar image FI and a line image LI as an outline image to thereby form a stereoscopic image I.

Figure 13:
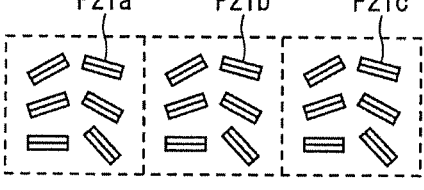
FIG. 13 illustrates examples of arrangement for on one hand using a group of first optical path deflectors to form a planar image for use of the planar image, and using the group of first optical path deflectors to form a line image for use as an outline image.
Figure 13:
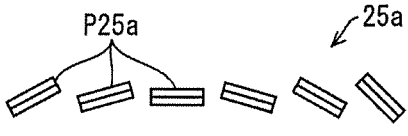
Figure 13:
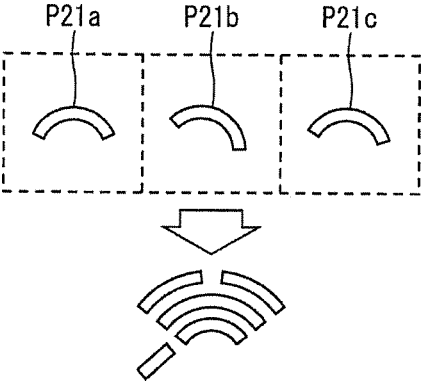
Figure 13:
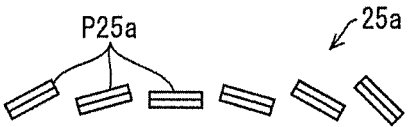

Hereafter, examples of using and distributing the groups of first optical-path deflectors 21a, 21b, 21c, . . . and the groups of second optical-path deflectors 25a, 25b, 25c, . . . are described on the basis of FIG. 13 through FIG. 15. These groups of first optical-path deflectors 21a, 21b, 21c, . . . and groups of second optical-path deflectors 25a, 25b, 25c, . . . are used to form a combination of a planar image FI and a line image LI that serves as an outline therefor respectively. FIG. 13 illustrates examples of arrangement for using groups of first optical-path deflectors 21a, 21b, 21c, . . . to form a planar image FI, and using groups of first optical-path deflectors 21a, 21b, 21c, . . . to form a line image LI that serves as the outline of the planar image FI; FIG. 14 illustrates an example distribution when a group of first optical path deflectors 21a, 21b, 21c, . . . is used either for forming a planar image or an outline image; and FIG. 15 illustrates an example of arrangement when a group of first optical-path deflectors 21a, 21b, 21c, . . . is used either for forming a planar image or an outline image.

First, groups of first optical-path deflectors 21a, 21b, 21c, . . . may be used to form a planar image FI, while using groups of first optical-path deflectors 21a, 21b, 21c, . . . to form a line image LI that serves as the outline of the planar image FI.

In this case, in Example 1, tetrahedral prisms P21a, 21b, 21c are arranged in a matrix of three rows and two columns with some gaps therebetween (FIG. 13); here, the tetrahedral prisms P21a, 21b, 21c serve as the groups of first optical-path deflectors 21a, 21b, 21c, . . . which form the planar image FI. Whereas, a group of second optical-path deflectors 25a may be arranged in a row for forming the line image LI.

In the Example 2, multiple tetrahedral prisms P21a, 21b, 21c are arranged mutually adjacent on an arc (FIG. 13); here, the tetrahedral prisms P21a, 21b, 21c serve as the groups of first optical-path deflectors 21a, 21b, 21c, . . . which form the planar image FI. Whereas, a group of second optical-path deflectors 25a may be arranged in a row for forming the line image LI similarly to Example 1.

Thus, a stereoscopic image I may be formed by the groups of first optical-path deflectors 21a, 21b, 21c and the groups of second optical-path deflectors 25a, 25b, 25c; here, the groups of first optical-path deflectors 21a, 21b, 21c create a planar image FI with a small light intensity that is outlined by a line image LI of large light intensity created by the groups of second optical-path deflectors 25a, 25b, 25c.

Alternatively, a group of first optical path deflectors 21a, 21b, 21c, . . . may be used either for forming a planar image or an outline image.

In this case, in Example 3, tetrahedral prisms P21a, 21b, 21c are arranged in a 3×2 matrix with gaps therebetween (FIG. 14); here, the tetrahedral prisms P21a, 21b, 21c serve as the groups of first optical-path deflectors 21a, 21b, 21c, . . . which form the planar image FI. Additional groups of first optical-path deflectors 21a, 21b, 21c may be similarly provided for the most part for forming the line image LI. In this case, the size of the tetrahedral prisms P21a, 21b, 21c in the groups of first optical-path deflectors 21a, 21b, 21c, . . . used to create the line image LI are larger than those in the groups of first optical-path deflectors 21a, 21b, 21c, . . . used to form the planar image FI.

Alternatively, in the Example 4, the tetrahedral prisms P21a, 21b, 21c are arranged on an arc (FIG. 14); here, the tetrahedral prisms P21a, 21b, 21c serve as the groups of first optical-path deflectors 21a, 21b, 21c which form the planar image FI. Whereas, the groups of first optical-path deflectors 21a, 21b, 21c, . . . for forming the line image LI may be tetrahedral prisms P21a, 21b, 21c arranged in a 3×2 matrix along an arc similarly to Example 3.

As depicted in Example 5 (FIG. 14), the group of first optical-path deflectors 21a may be configured so that a portion of a single tetrahedral prism P21a with an arced profile is used to form a planar image FI that serves as the planar image; the other portion of the single prism P21a is used to form the outline image.

Moreover, as depicted in Example 6 (FIG. 14), the group of first optical-path deflectors 21a may be configured so that a single tapered truncated conical prism P21a forms a planar image FI that serves as the planar image and a single tetrahedral prism P21a forms the outline image.

Hereby, a group of first optical-path deflectors 21a are used to form a planar image FI, and the group of first optical-path deflectors 21a form a planar image FI that serves as an outline image. A clearer stereoscopic image I may thus be obtained giving the planar image used as the outline image a different contrast, or a white outline.

Additionally, a group of third optical-path deflectors 22 may be used for forming a parallax planar image FI that may serve as a planar image or an outline image.

In this case, as depicted by Example 7 (FIG. 15), for instance, groups of third optical-path deflectors 22 may be used which are provided with a prism P22 for forming a parallax planar image FI. The prisms P22 include a lettering portion P22a (e.g., for the letter 'A'), and the parallax planar image FI may be used as either a planar image or an outline image. Note that while, a lettering portion P22a (e.g., for the letter 'A'), used for a planar image forms the image of a plane and a lettering portion P22a (e.g., for the letter 'A') used for an outline image forms the image of an outline.

Alternatively, as depicted in Example 8 (FIG. 15), the group of first optical-path deflectors 21a may be configured so that a single, tapered, truncated conical prism P21a produces a parallax image to create the planar image FI used as the planar image. At the same time, the group of first optical-path deflectors 21a may also be configured so that single tetrahedral prism P21a produces a parallax image to create the planar image used as the outline image.

Moreover, as depicted in Example 9 (FIG. 15), the group of first optical-path deflectors 21a may be configured so that a single small tetrahedral prism P21a produces a parallax image used as a planar image, and a single large tetrahedral prism P21a produces a parallax image used as an outline image.

Hereby, a group of first optical-path deflectors 21a and a group of third optical-path deflectors 22 may be used for forming a parallax planar image FI that may serve as a planar image or an outline image.

An optical device 1A of this embodiment is thus provided with a planar-image forming unit that emits light that forms a planar image FI of a predetermined shape in a space, and an outline-image forming unit that emits light that forms an outline image BI with a different light intensity than the planar image FI at the outer-edge region of the planar image FI.

The method of three-dimensional display according to this embodiment involves forming a planar image FI of a predetermined shape in a space, and forming an outline image BI with a different light intensity than the planar image FI at the outer-edge region of the planar image FI.

Figure 16A:
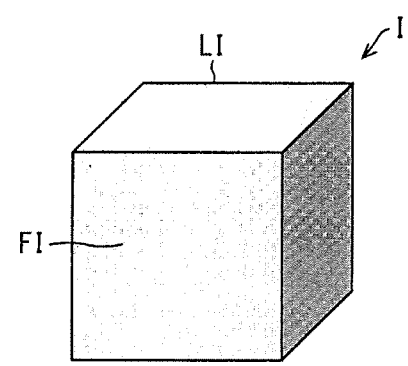
FIGS. 16A and 16B are perspective views illustrating a stereoscopic image made up of a planar image and an outline image formed by the optical device.

As illustrated in FIG. 16A, given this configuration, light emitted with a planar-image forming unit thereby forms a stereoscopic image I from a planar image FI of a predetermined shape in a space; furthermore, light emitted with an outline-image forming unit to form a stereoscopic image I from an outline image BI having a different light intensity from the planar image FI at the outer-edge region of the planar image FI.

Therefore, even if by itself the border of a planar image FI is unclear, a planar image FI may appear more three-dimensional by forming an outline image BI with light having a different light intensity than the light in the planar image FI as the border of the planar image FI. Accordingly, the optical device 1A and the method of three-dimensional display thus facilitates the perception of three dimensionality.

Figure 16B:
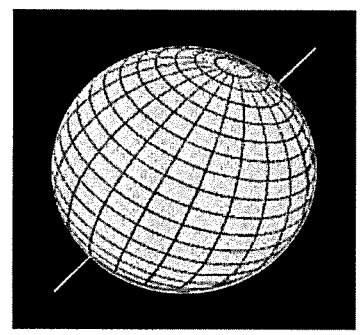

The effect can be applied to presenting a polygon as illustrated in FIG. 16B.

Furthermore, the capability of this kind of display allows, for example, a stereoscopic image I that pops out horizontally from a wall to be applied as an advertisement, a stereoscopic image I that pops down from the ceiling to be applied as guidance lighting, or formed as a guidance map or bulletin board on a hallway surface. In terms of the display on a machine, the stereoscopic image I may be used for displaying the logo representing the floor for an elevator, a non-contact switch, or as an indicator representing "on" or a similar state.

The techniques described for the optical device 1A of this embodiment is not limited thereto. For instance, the techniques may be applied in Japanese Patent Publication No. 2011-175297 which provides first and second light control panels produced from strips of flat optical reflectors aligned at a constant pitch; the stereoscopic image is produced from the first and second light control panels facing each other so that the optical reflectors are orthogonal. The techniques described may also be applied in Japanese Patent Publication No. 2012-118378, which uses a reflective plane-symmetrical image forming element and a mirror; light passes through the imaging element and forms a real image in the symmetrical plane; the imaging element and mirror produce a real image of an object projected onto a non-existent virtual mirror. The techniques described may also be applied in Japanese Patent Publication No. 2001-255493 which produces a stereoscopic image using a microlens array.

The techniques described for the optical device 1A may also be applied in technology that emits plasma in a space and causes a three-dimensional image to float therein ("Projecting a Three-dimensional (3D) Image in Space", NAIST, April 2016); or technology using a transmissive film, also known as the paper ghost, as a half-mirror to synthesize a stereoscopic image; or finally, technology that uses holography to produce the stereoscopic image.

The optical device 1A of the embodiment is also equipped with a plurality of optical-path deflectors 20 which can function as a planar-image forming unit and an outline-image forming unit. The plurality of optical-path deflectors 20 is arranged on the light guide plate 10 which directs the light entering therein from the light source 2 and emits the light from an emission surface 12. The optical-path deflectors 20 change the optical path of light guided thereto, causing the light to exit therefrom and form a stereoscopic image I in a space. The plurality of optical-path deflectors 20 further include a group of planar-image optical-path deflectors 21 that function as the planar-image forming unit, and a group of outline-image optical-path deflectors 24 that function as the outline-image forming unit. The planar-image optical-path deflectors 21 change the optical path of light directed thereto causing the light to exit therefrom and form a planar image FI in a space; and, the outline-image optical-path deflectors 24 change the optical path of light directed thereto causing the light to exit therefrom and form an optical and outline image BI in a space.

Hereby, the optical device 1A is configured from a light source 2 from which light enters the light guide plate 10; and the light guide plate 10 is equipped with a plurality of optical-path deflectors 20; the optical device 1A thus has a simple configuration.

More specifically, in this embodiment groups of planar-image optical-path deflectors 21, and group of outline-image optical-path deflectors 24 function as the plurality of optical-path deflectors 20. The planar-image optical-path deflectors 21 change the optical path of light directed thereto causing the light to exit therefrom and form a planar image FI in a space; and, the outline-image optical-path deflectors 24 changes the optical path of light directed thereto, causing the light to exit therefrom and form an optical and outline image BI in a space.

Therefore, an optical device 1A capable of facilitating the perception of three dimensionality can be simply configured. This is because the group of planar-image optical-path deflectors 21 and the group of outline-image optical-path deflectors 24 make up the plurality of optical-path deflectors 20.

The group of outline-image optical-path deflectors 24 in the optical device 1A in the embodiment may also be made up of groups of line-image optical-path deflectors 25 that form an outline image BI with a light intensity that is greater than that of the planar image FI, and form a line image LI as an outline image BI that outlines the planar image FI.

Thus, the group of line-image optical-path deflectors 25 can form an outline image BI that has a light intensity greater than that of the planar image FI. Therefore, the groups of line-image optical-path deflectors 25 form a line image LOI relative to the planar image FI, and further form a line image LI that has a light intensity greater than that of the planar image FI.

As a result, an optical device 1A that facilitates the perception of three-dimensionality can be provided because the border of the planar image FI is formed with a line image LI having a greater light intensity.

Additionally, the group of outline-image optical-path deflectors 24 in the optical device 1A in the embodiment distributes a plurality of groups of second optical-path deflectors 25 made up of prisms P25a, P25b, P25c, P25d, P25e, P25f, P25g that function as the plurality of second optical-path deflectors. The prisms P25a, P25b, P25c, P25d, P25e, P25f, P25g form point images PI whereby the point images appear to form the line image LI.

In other words, the optical device 1A is provided with a plurality of light focusing portions and each light focusing portion includes an optical surface whereon light directed from the light guide plate 10 is incident. The optical surfaces cause light incident thereon to exit from the emission surface 12 and substantially converge on a single convergence point or convergence line in a space, or substantially radiate from a single convergence point or convergence line in a space. The plurality of light focusing portions are formed a long a predetermined line within a plane parallel to the emission surface 12. A convergence point or convergence line is mutually different for the plurality of light focusing portions and grouping a plurality of said convergence points or convergence lines produces an image in a space.

Hereby, the prisms P25a, P25b, P25c, P25d, P25e, P25f, P25g in the group of second optical-path deflectors 25 each form a single point image PI; therefore, this creates a single point image PI with a greater light intensity. Given that a plurality of point images PI is formed by the group of second optical-path deflectors 25 via the groups of second optical-path deflectors 25a, 25b, 25c, 25d, 25e, 25f, 25g, the point images PI are already aligned and thus appear recognizably as a line image LI.

Consequently, the group of second optical-path deflectors 25 may be created in the light guide plate 10 to have a plurality of prisms P25a, P25b, P25c, P25d, P25e, P25f, P25g that serve as the optical-path deflectors 20 that form an image; hereby, an outline image BI can be easily produced from a line image LI with a strong light intensity.

Additionally, the group of planar-image optical-path deflectors 21 in the optical device 1A in the embodiment are distributed as a plurality of groups of first optical-path deflectors 21a, 21b, 21c, . . . that form line images LI and are made up of prisms P21a, 21b, 21c, . . . that function as first optical-path deflectors. The prisms P21a, 21b, 21c, . . . form point images PI whereby the point images appear to form the planar image FI.

In other words, the optical device 1A is provided with a light guide plate 10 that propagates light from a light source 2 in a plane parallel to the emission surface 12, and a plurality of optical deflectors arranged two-dimensionally in a plane parallel to the emission surface 12 and each deflecting light propagating through the light guide plate 10. The optical deflectors cause light to exit from the emission surface 12 and form an image in a space. Each optical deflector spreads light incident thereon within a plane parallel to the emission surface 12 and causes light with an intensity distribution according to an image to exit from the emission surface 12 toward a direction orthogonal to the light guiding direction of the light guide plate 10. Hereby, light from the plurality of optical deflectors which are along a direction orthogonal to the light guiding direction, converge at or radiate from the image. Alternatively, the optical device 1A is provided with a light guide plate 10 that propagates light from a light source 2 in a plane parallel to the emission surface 12, and a plurality of optical deflectors arranged two-dimensionally in a plane parallel to the emission surface 12 and each deflecting light propagating through the light guide plate 10. The optical deflectors cause light to exit from the emission surface 12 and form an image in a space. Each optical deflector spreads light incident thereon two-dimensionally and causes light with an intensity distribution according to an image to exit from the emission surface 12. Hereby, light from three optical deflectors not arranged on the same straight line converge at or radiate from the image.

Thus, the groups of first optical-path deflectors 21a, 21b, 21c, . . . formed in the light guide plate 10 and functioning as the optical-path deflectors 20 can thereby form the line image LI that make up a portion of the planar image FI. Additionally, providing the groups of first optical-path deflectors 21a, 21b, 21c, . . . increases the thickness of the line image LI. Therefore, the line image appears to form a two-dimensional planar image FI.

Thus, providing the plurality of groups of first optical-path deflectors 21a, 21b, 21c, . . . to serve as optical-path deflectors 20 in the light guide plate 10 facilitates forming a two-dimensional planar image FI.

The group of planar-image optical-path deflectors 21 in the optical device 1A of the embodiment may be configured from groups of third optical-path deflectors 22 that use a parallax image to form a planar image FI.

Thus, the optical device 1A may provide a planar image FI with a clear outline and facilitate the perception of three dimensionality even when the optical-path deflectors 20 in the light guide plate 10 are groups of third optical-path deflectors 22 that use a parallax image to create the planar image FI.

The group of planar-image optical-path deflectors 21 that form the planar image FI and the group of outline-image optical-path deflectors 24 that form the outline image BI are mutually different in at least one of pattern shape and pattern size in the optical device 1A. Hereby, the planar image FI and the outline image BI formed may be made mutually different.

Second Embodiment

An embodiment of the present invention is described below with reference to FIG. 17 through FIG. 19. The configurations not described in this embodiment are identical to the previously described first embodiment. For the sake of convenience, components previously described in the first embodiment that have an identical function are given the same reference numerals, and explanations therefor are omitted.

Figure 17:
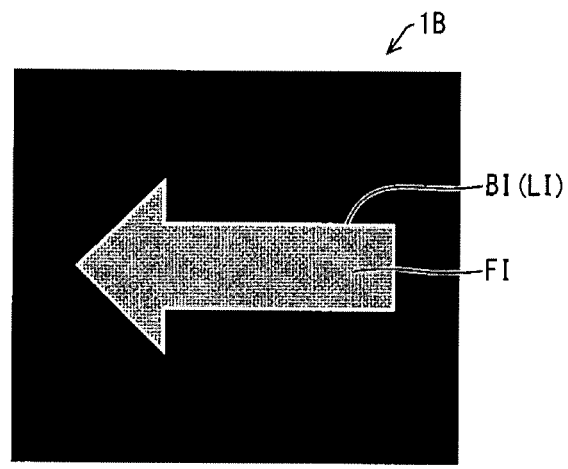
FIG. 17 illustrates an optical device according to a second embodiment of the invention and is a front view illustrating a planar image and an outline image formed by the optical device.

As illustrated in FIG. 17, adding to the configuration of the optical device 1A of the first embodiment, the optical device 1B of this embodiment provides a planar image FI and the line image LI that is the outline with mutually different colors.

More specifically, for example, assume that the planar image FI is green and the line image on FI is white to thereby provide different colors for the planar image FI and the line image LI. Therefore, this allows three dimensionality to be easily obtained, and the stereoscopic image to be easy to perceive.

Note that, in order to make the stereoscopic image easy to perceive, the optical device 1B of the embodiment may employ other methods.

Figure 18A:
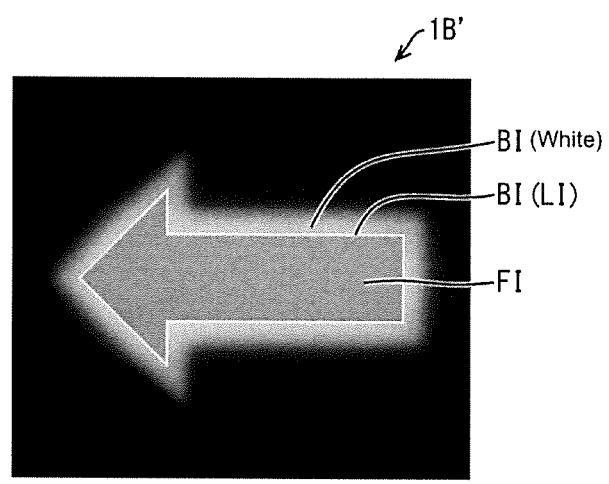
FIG. 18A illustrates an example of modifying the optical device according to the second embodiment of the present invention and is a front view illustrating a planar image and an outline image formed by the optical device; and 18B is a perspective view illustrating a planar image and an outline image formed by the optical device.
Figure 18B:
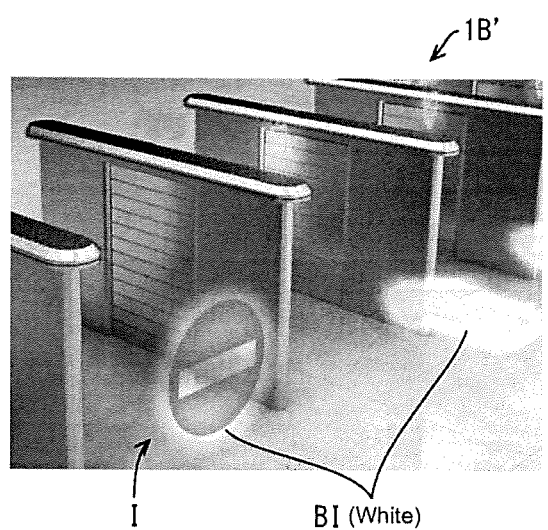
Figure 19A:
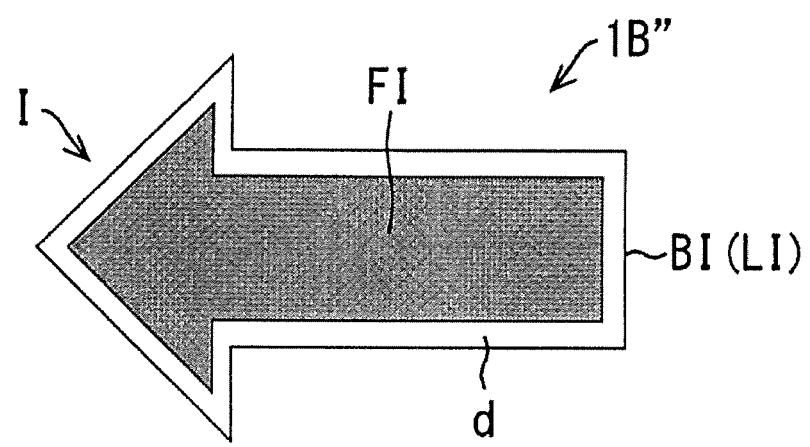
FIG. 19A illustrates an example of modifying the optical device according to the second embodiment of the present invention and is a front view illustrating a planar image and an outline image formed by the optical device; and 19B is a graph illustrating the relationship between the light intensity and position of the planar image and the outline image formed by the optical device.

As illustrated in FIG. 18A, 18B, an optical device 1B' may form, for example, an outline image BI from a line image LI at the outer-edge region of a planar image FI; and at the same time the optical device 1B' may form a white outline image BI outside the outline image BI formed from the line image LI.

Therefore, the blurring is no longer sensed when the outer-edge region of the planar image FI is blurry because the white outline image BI hides the blurred portion.

Consequently, this allows three dimensionality to be easily obtained, and facilitates perceiving the stereoscopic image I. This also makes it possible to add a high-quality feel to stereoscopic image I.

As illustrated in FIG. 18A, an optical device 1B' may form, for example, an outline image BI from a line image LI at the outer-edge region of a planar image FI; and at the same time the optical device 1B' may form the outline image BI and the planar image FI with a gap d therebetween.

Figure 19B:
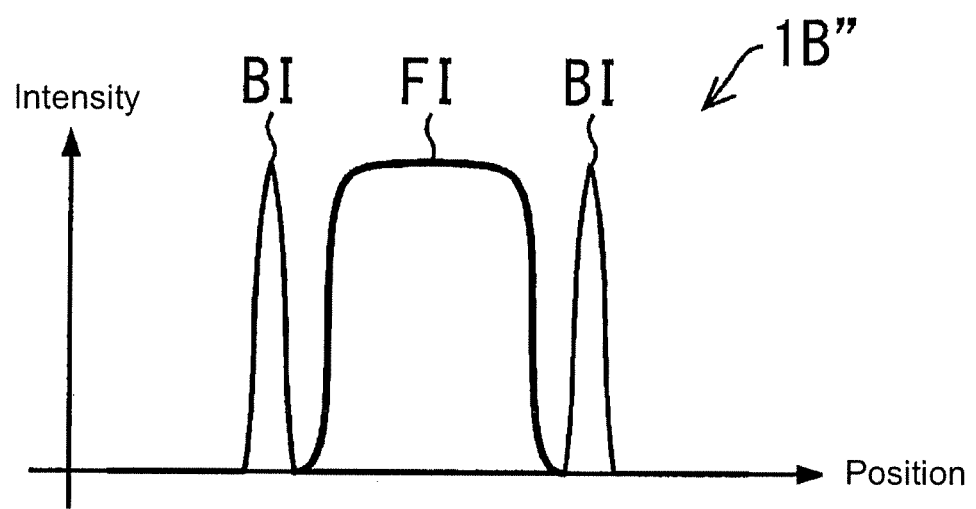

Thus, a dark area is created between the planar image FI and the outline image BI in the stereoscopic image I as illustrated in FIG. 19B.

Consequently, this allows three dimensionality to be easily obtained. The stereoscopic image I is also easy to perceive as a result of creating a dark area at the outer-edge region of the planar image FI.

Third Embodiment

An embodiment of the present invention is described below with reference to FIG. 20A through FIG. 25B. The configurations not described in this embodiment are identical to the previously described first and second embodiments. For the sake of convenience, components previously described in the first and second embodiments that have an identical function are given the same reference numerals, and explanations therefor are omitted.

In addition to the features of the optical device 1A of the first embodiment, the optical device 1C of this embodiment uses the group of planar-image optical-path deflectors 21 to form a planar image FI, where the inner and outer region of the planar image FI have the same light intensity.

Figure 20A:
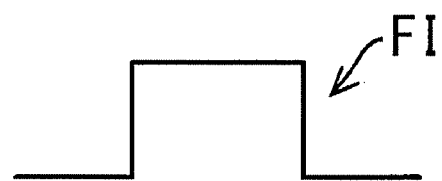
FIG. 20A is a graph representing the light intensity of a planar image at the design stage and presents an example of an optical device configured as a comparison to the optical device according to a third embodiment of the present invention; 20B is a graph of the light intensity of a planar image actually formed by the aforementioned optical device; and 20C is a front view of the planar image formed by the aforementioned optical device.
Figure 20B:
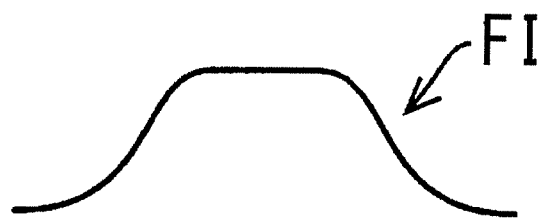
Figure 20C:
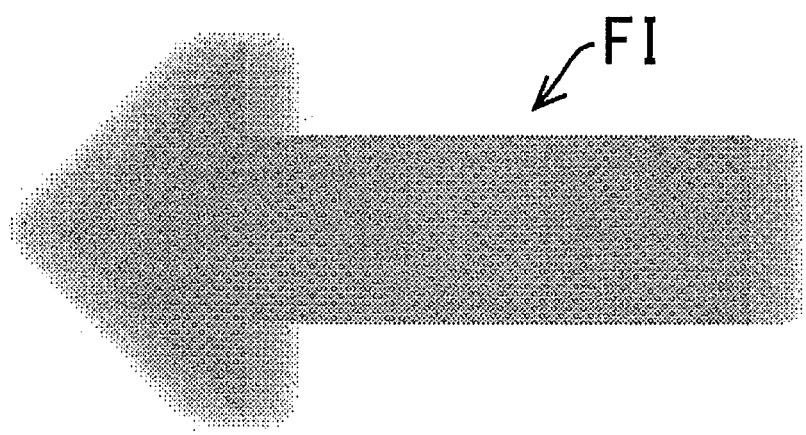

First, the planar images FI formed by the optical device 1C of the embodiment and another optical device are described for comparison with reference to FIG. 20A, 20B, 20C.

Figure 21:
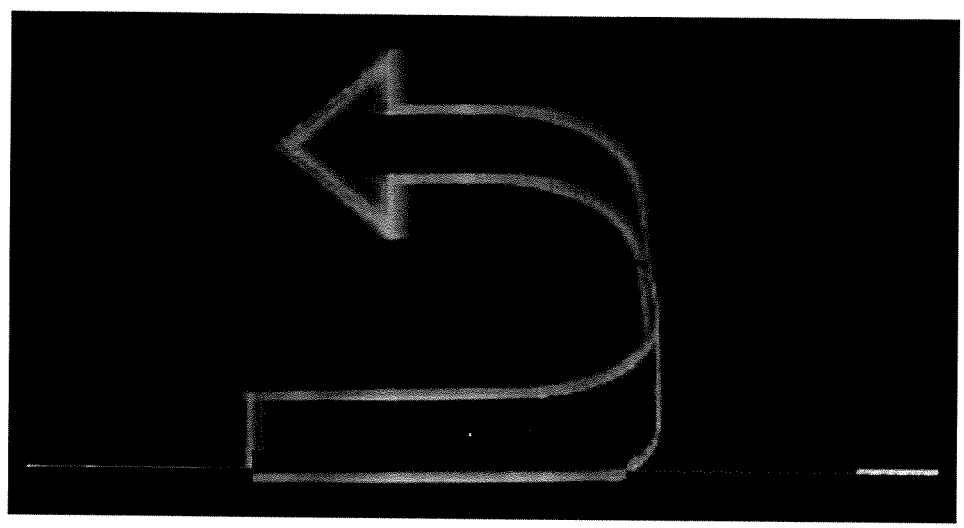
FIG. 21 is a perspective view illustrating how blurring occurs at the outer-edge regions of a planar image due to the optical device according to the comparative example.

As illustrated in FIG. 20A, the planar image FI formed by the optical device is designed to have a light intensity that is a square wave. However, the light intensity distribution of an actual planar image on FI is not a square wave as illustrated in FIG. 20b); instead, the outer-edge region of the plane or image on FI is blurred as illustrated in FIG. 20C and FIG. 21.

This may be due to the precision when machining the prisms P21a in the group of planar-image optical-path deflectors 21 created in the light guide plate 10 for forming the planar image FI. More specifically, this may be due to distortions in the machining process.

Figure 22A:
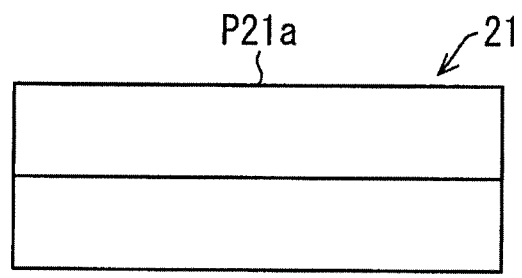
FIG. 22A is a plan view illustrating the shape of prisms at the design stage; and 22B is a graph illustrating a light intensity distribution of a planar image formed by these prisms.
Figure 22B:
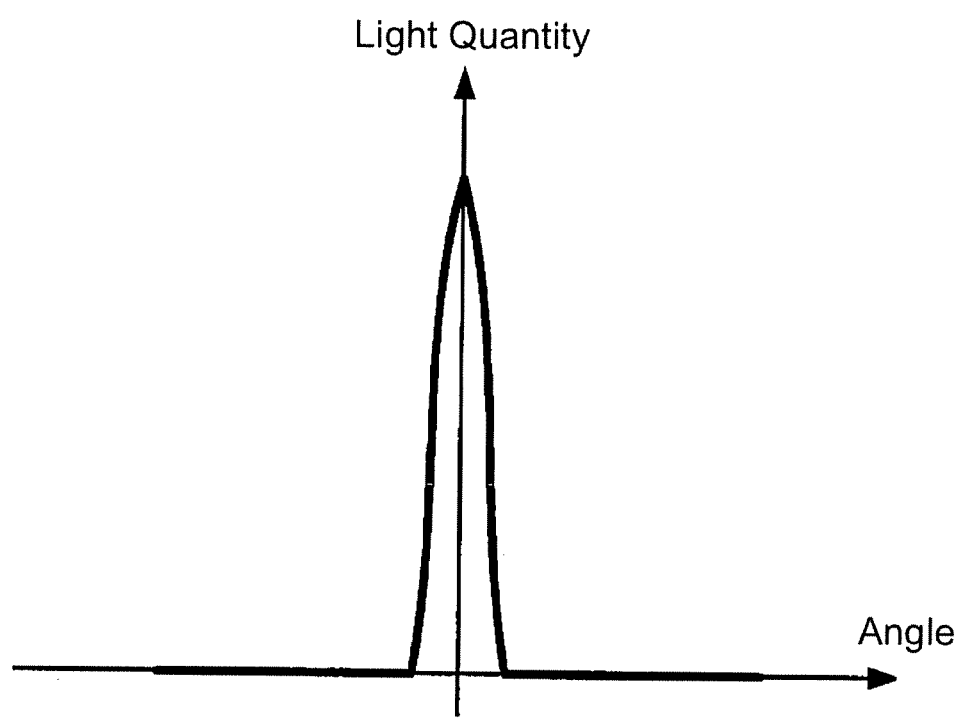

That is, prisms P21a designed with sharp corners as illustrated in FIG. 22A, may achieve a narrow and pointed light distribution band as illustrated in FIG. 22B.

Figure 23A:
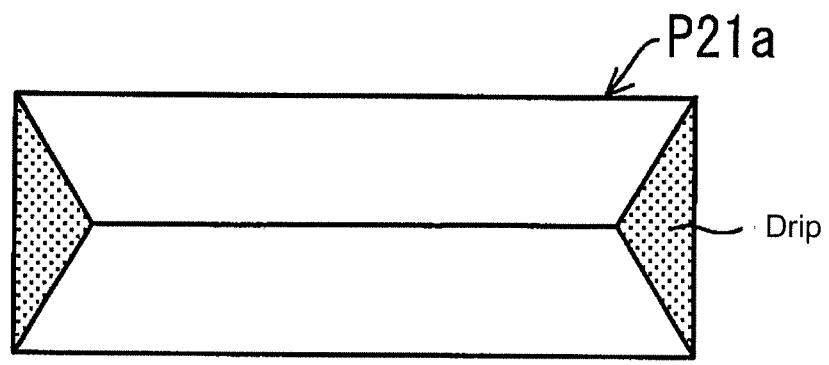
FIGS. 23A and 23B are plan views of actually molded prisms where drips were formed; and 23C is a graph illustrating a light intensity distribution of a planar image formed by these prisms.
Figure 23B:
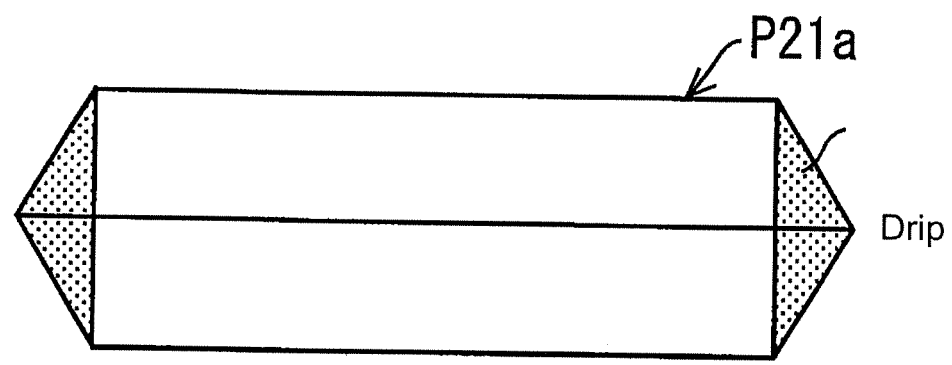
Figure 23C:
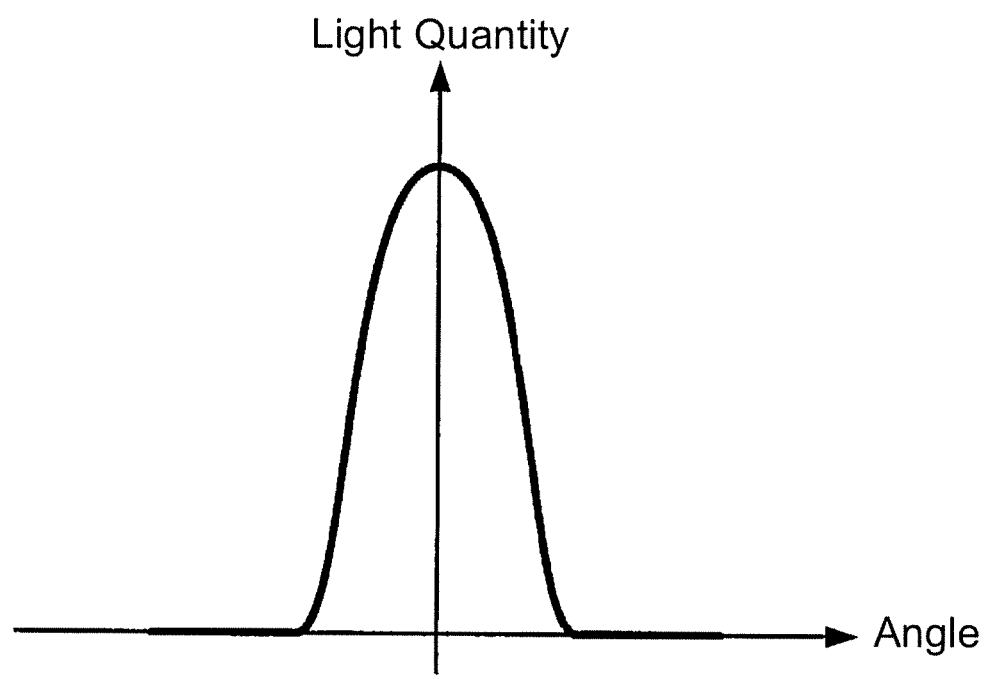

However, the prisms P21a produce have drips as illustrated in FIG. 23A, 23B, which create a light distribution band that is broad as illustrated in FIG. 23C.

Figure 24A:
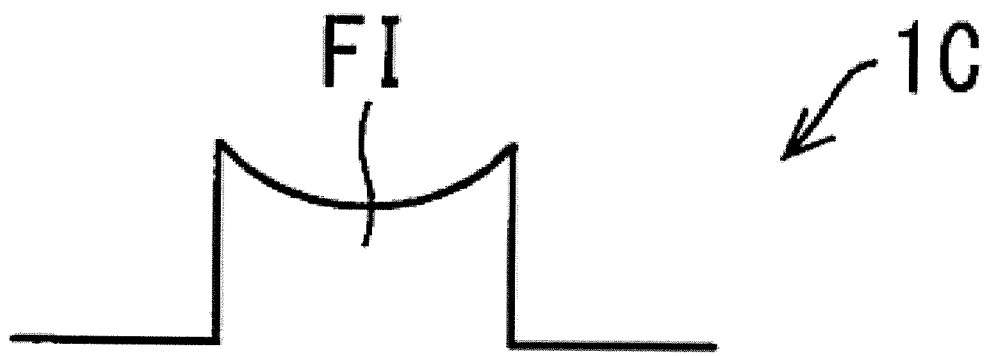
FIG. 24A illustrates an optical device according to a third embodiment of the present invention and is a graph illustrating when the outer-edge region of the planar image is a greater light intensity than inside the outer-edge region of said planar image at the design stage; 24B is a graph illustrating the distribution of light intensity of an actual planar image; and 24C is a front view illustrating how the shape of a planar image may be perceived even when the outer-edge region of the planar image is blurred.

Therefore, as illustrated in FIG. 24A, the optical device 1C of the embodiment is designed so that the outer-edge region of the planar image FI formed by the aforementioned group of planar-image optical-path deflectors 21 has a stronger light intensity than the parts inside the outer-edge region.

Figure 24B:
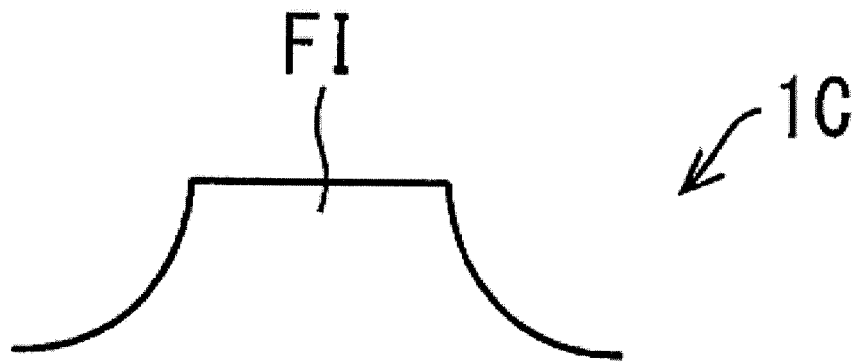

Thus, as illustrated in FIG. 24B, the light intensity distribution of the actual planar image FI formed by the group of planar-image optical-path deflectors 21 is identical for the inner and outer-edge region of the planar image FI. Less reflection surfaces may be provided in the groups of first optical-path deflectors 21a, 21b, 21c, . . . in the group of planar-image optical-path deflectors 21 to achieve this effect.

Hereby, there is a sharp change in light intensity between the outer-edge region and other regions of the planar image FI.

Figure 24C:
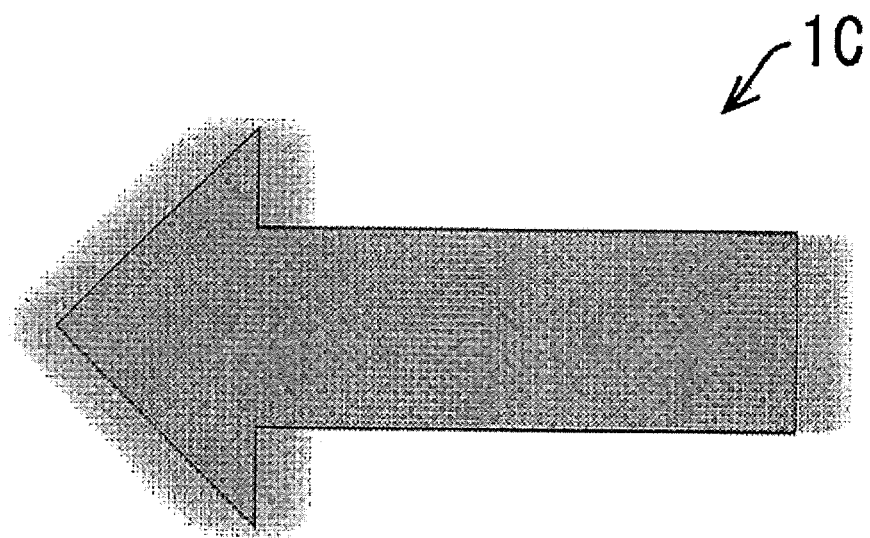

Therefore, as illustrated in FIG. 24C, the shape of the planar image FI can be easily perceived even when the outer-edge region of the planar image FI is blurry.

Figure 25A:
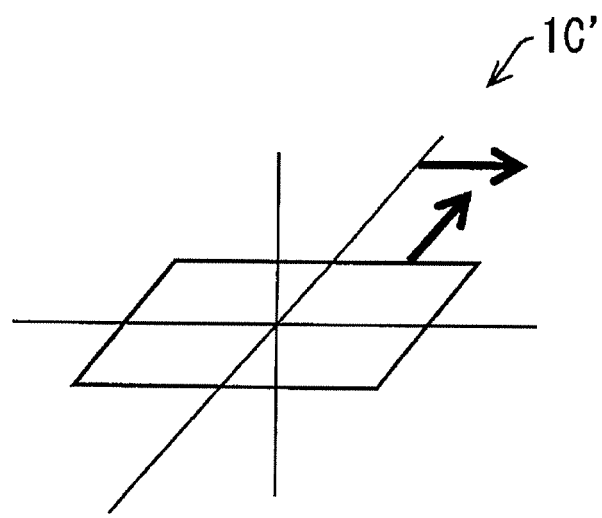
FIG. 25A illustrates an example of modifying the optical device according to the third embodiment of the present invention and is a perspective view of how the intensity distribution improves along both the vertical and horizontal directions; and 25B is a perspective view illustrating a planar image when the intensity distribution improves along the horizontal and vertical directions.

Note that the optical device 1C depicted in FIG. 24C only improves the light intensity distribution along the horizontal axis. However, the improvement is not limited thereto. For instance, as illustrated in FIG. 25A, an optical device 1C' may improve both the vertical and horizontal axis of the intensity distribution.

Figure 25B:
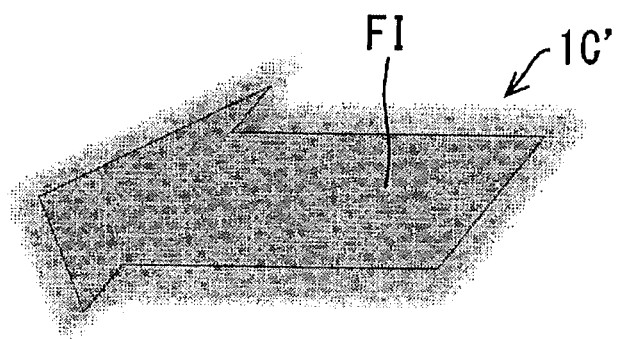
Figure 26:
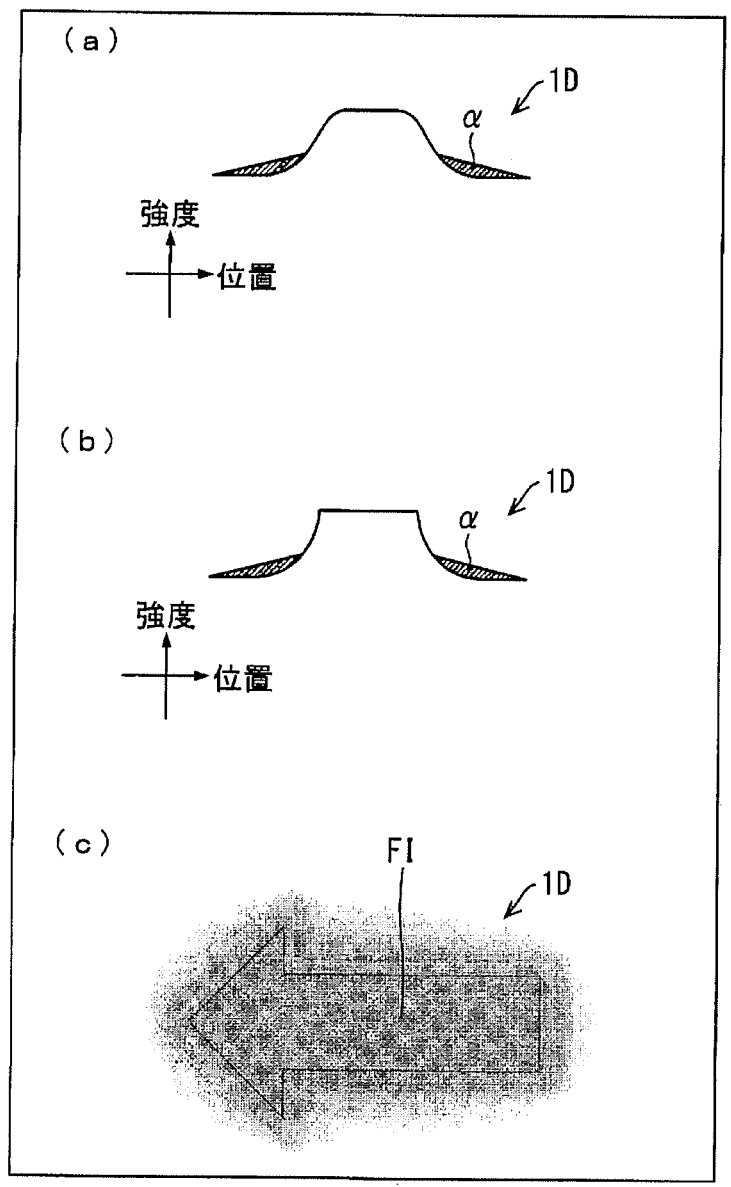
FIG. 26A, 26B illustrates a configuration of an optical device according to fourth embodiment of the present invention and is a graph illustrating when the distribution of light intensity in the planar image dips below a base value; and 26C is a front view illustrating the planar image when the optical device increases the distribution of light intensity in the planar image above the light intensity base value.

Hereby, a planar image FI within intensity distribution that improves along both the horizontal and vertical axes may be obtained as illustrated in FIG. 25B.

The optical device 1C of this embodiment thusly uses the group of planar-image optical-path deflectors 21 to form a planar image FI, where the inner region and outer-edge region of the planar image FI have the same light intensity.

Hereby, there is a sharp change in light intensity between the outer-edge region and other regions of the planar image FI. Therefore, the shape of the planar image FI can be perceived even when the outer-edge region of the planar image FI is blurry.

The group of planar-image optical-path deflectors 21 in the optical device 1C are configured so that a greater proportion of reflection surfaces are in the groups of first optical-path deflectors 21a, 21b, 21c, . . . creating the outer-edge region than in the groups of first optical-path deflectors 21a, 21b, 21c, . . . creating the inner region of the planar image FI.

This configuration increases the light intensity in the outer-edge region of the planar image FI compared to the light intensity of the inner region. Consequently, the inner and outer-edge regions of the planar image FI are formed with the same light intensity in the actual stereoscopic image I.

Fourth Embodiment

An embodiment of the present invention is described below with reference to FIG. 26A through FIG. 27B. The configurations not described in this embodiment are identical to the previously described first through third embodiments. For the sake of convenience, components previously described in the first through third embodiments that have an identical function are given the same reference numerals, and explanations therefor are omitted.

In addition to the features of the optical device 1A of the first embodiment, the optical device 1D of this embodiment reduces the difference in the light intensity of regions outside the outer-edge region and the light intensity at the inner part of the planar image FI formed by the group of planar-image optical-path deflectors 21; more specifically, the optical device 1D increases the light intensity of parts of the planar image FI other than the outer-edge region. The optical device 1D also increases the light intensity of regions other than the outer-edge region of the planar image FI to ensure there is a singular point the light intensity curve of regions outside the outer-edge region of a plane are in a FI formed by the group of planar-image optical-path deflectors 21.

That is, the base of the light intensity distribution of a planar image FI is kept low for the optical device 1A of the first embodiment or the optical device 1C of the third embodiment as illustrated in FIGS. 26A and 26B.

Therefore, the optical device 1D of this embodiment increases the low intensity at the base of the distribution by an exact light intensity a as illustrated in FIG. 26A and FIG. 26B. As a result, the light intensity in regions other that the outer-edge region of the planar image FI increase and introduces some blurring; hereby, this improves the visibility of the stereoscopic image I and imparts a high-quality feel to the image.

In this embodiment increasing the light intensity by exactly an intensity a in the embodiment creates a singular point in the light intensity curve; at this singular point the light intensity drops sharply from the outline of the planar image FI toward the surrounding areas. That is, this creates a non-continuous line where the level of blur changes suddenly at this singular point in the areas other than the outer-edge region of the planar image FI.

Therefore, as illustrated in FIG. 26C, the shape of the planar image FI can be easily perceived even when the outer-edge region of the planar image FI is blurry.

Figure 27A:
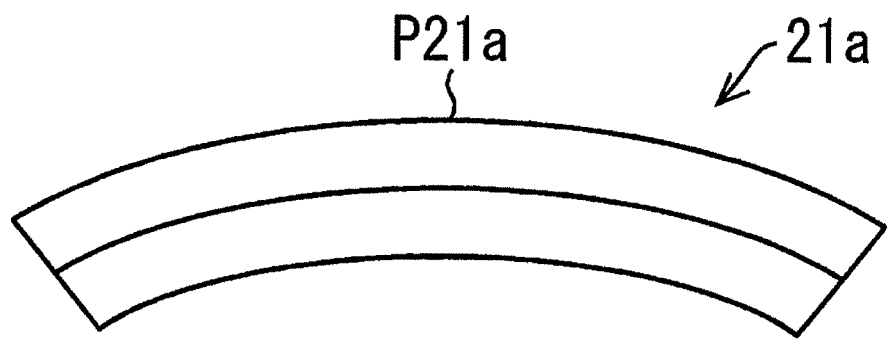
FIG. 27A is a perspective view illustrating a configuration of the prisms in a group of first optical path deflectors in the optical device illustrated in FIGS. 26A and 26B; and 27B is a perspective view illustrating a configuration of prisms in the first group in the optical device illustrated in FIG. 26C.
Figure 27B:
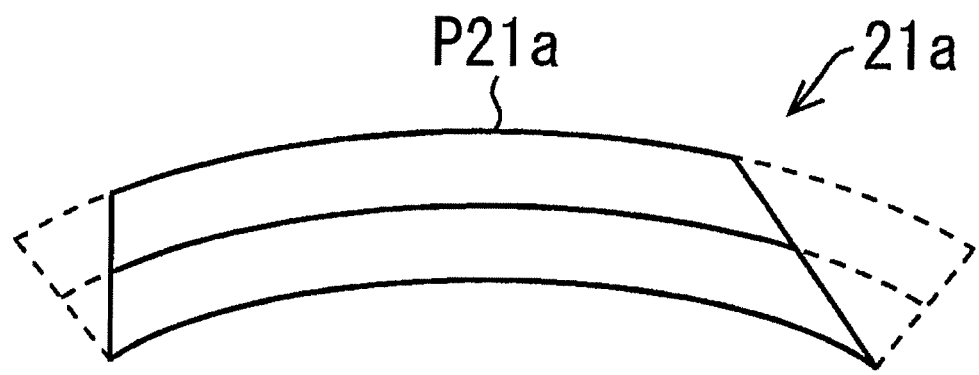

The prisms P21a in the group of first optical-path deflectors 21a may be configured to increase the light intensity at the base parts of the light intensity distribution having a low light intensity. More specifically, the arced prisms P21a (FIG. 27A) may be created with the reflection surface gradually decreasing (FIG. 27B).

Thus, the optical device 1D of this embodiment reduces the difference in the light intensity of regions outside the outer-edge region and the light intensity at the inner part of the planar image FI; more specifically, the optical device 1D increases the light intensity of parts of the planar image FI other than the outer-edge region.

Hereby, the light intensity in regions other that the outer-edge regions of the planar image FI increase and introduces some blurring, thus improving the visibility of and imparting a high-quality feel to the stereoscopic image I.

The optical device ID also increases the light intensity of regions other than the outer-edge region of the planar image FI to ensure there is a singular point in the light intensity curve of regions outside the outer-edge region of a plane are in a FI formed by the group of planar-image optical-path deflectors 21.

Thus, this creates a singular point in the regions other than the outer-edge region in the planar image FI; and, the light intensity at the location of the singular point changes sharply. Therefore, the shape of the planar image FI can be easily perceived even when the regions other than the outer-edge region of the planar image FI is blurry.

Fifth Embodiment

An embodiment of the present invention is described below with reference to FIGS. 28A, 28B, 28C, and 28D. The configurations not described in this embodiment are identical to the previously described first through fourth embodiments. For the sake of convenience, components previously described in the first through fourth embodiments that have an identical function are given the same reference numerals, and explanations therefor are omitted.

Figure 28A:
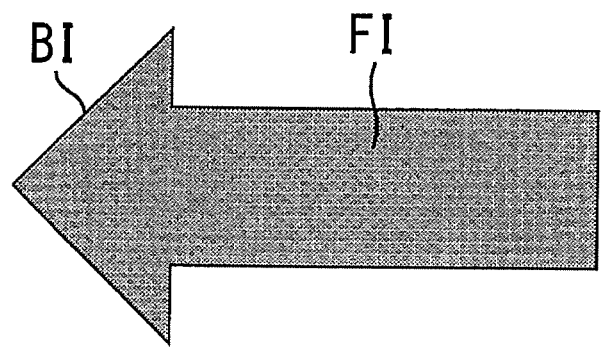
FIG. 28A is a front view illustrating a solid planar image; 28B, 28C illustrates the configuration of an optical device according to fifth embodiment of the present invention and is a front view of a planar image with a pattern; and 28D is a graph illustrating the light intensity distribution when the patterned planar image and the outline image are presented together.
Figure 28B:
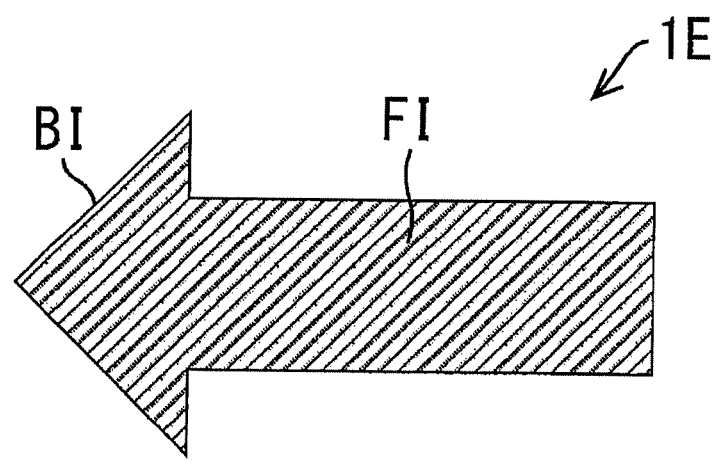
Figure 28C:
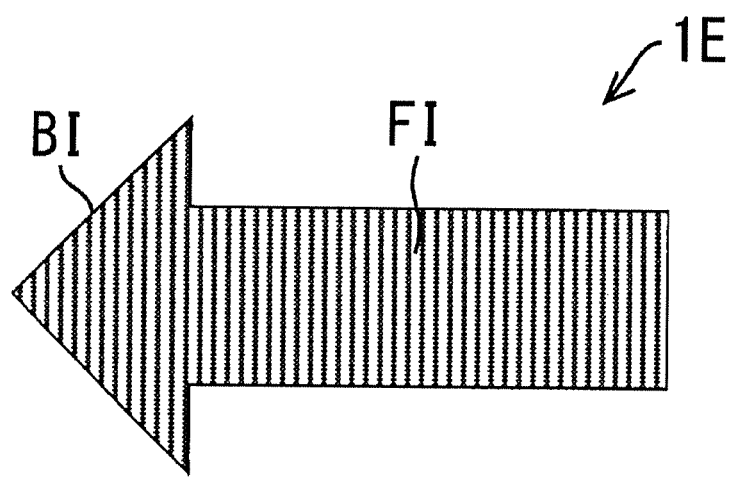

In addition to the features of the first embodiment, the optical device 1E of this embodiment gives the planar image FI formed by the group of planar-image optical-path deflectors 21 a pattern as illustrated in FIGS. 28B and 28C.

That is, the optical device 1A in the first embodiment forms a planar image FI that is solid as illustrated in FIG. 28A. However, experience teaches that providing a textured versus a solid surface makes it easier to perceive the stereoscopic image I.

Therefore, the optical device 1E is configured to add diagonal hatchings (FIG. 28B), or straight line hatchings (FIG. 28C) to the planar image.

Figure 28D:
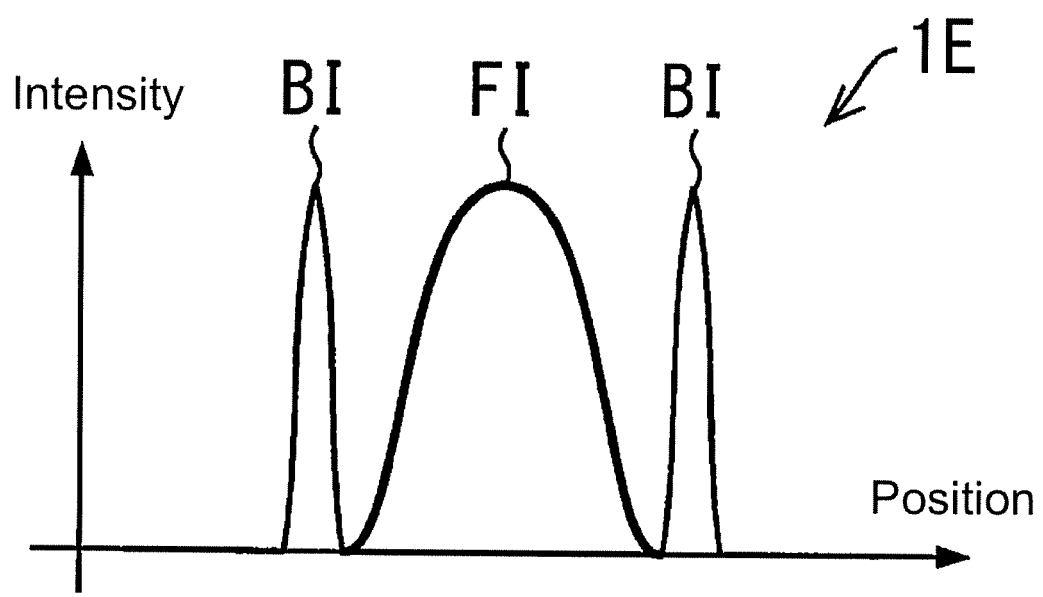

The optical device 1E may vary the light intensity distribution of the planar image FI as illustrated in FIG. 28D to give the planar image a pattern, e.g., stripes and thus texture. Hereby, the optical device 1E provides a planar image FI where it is easier to perceive three dimensionality than with a solid planar image FI.

Sixth Embodiment

An embodiment of the present invention is described below with reference to FIGS. 29A and 29B. The configurations not described in this embodiment are identical to the previously described first through fifth embodiments. For the sake of convenience, components previously described in the first through fifth embodiments that have an identical function are given the same reference numerals, and explanations therefor are omitted.

Figure 29A:
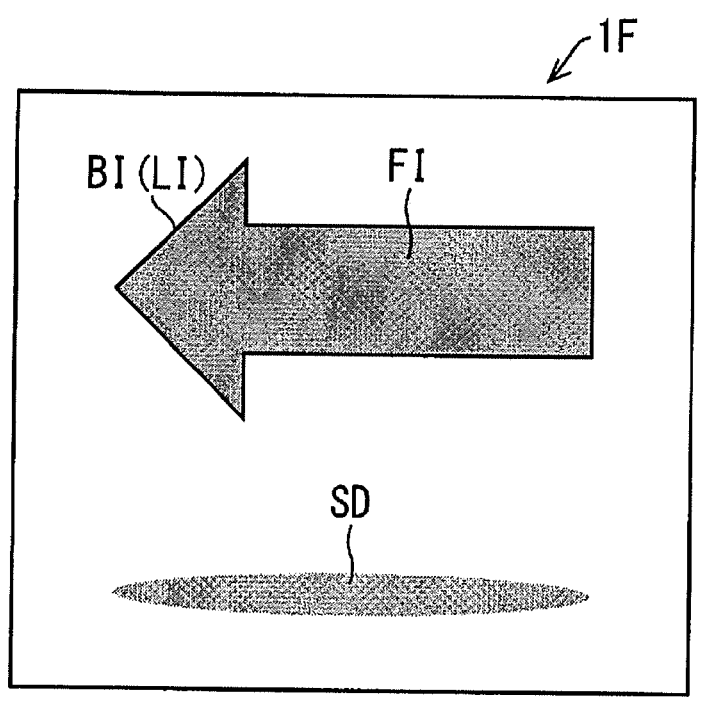
FIG. 29A, 29B illustrates a configuration of an optical device according to a sixth embodiment of the present invention, and is a front view of a planar image with a shadow.
Figure 29B:
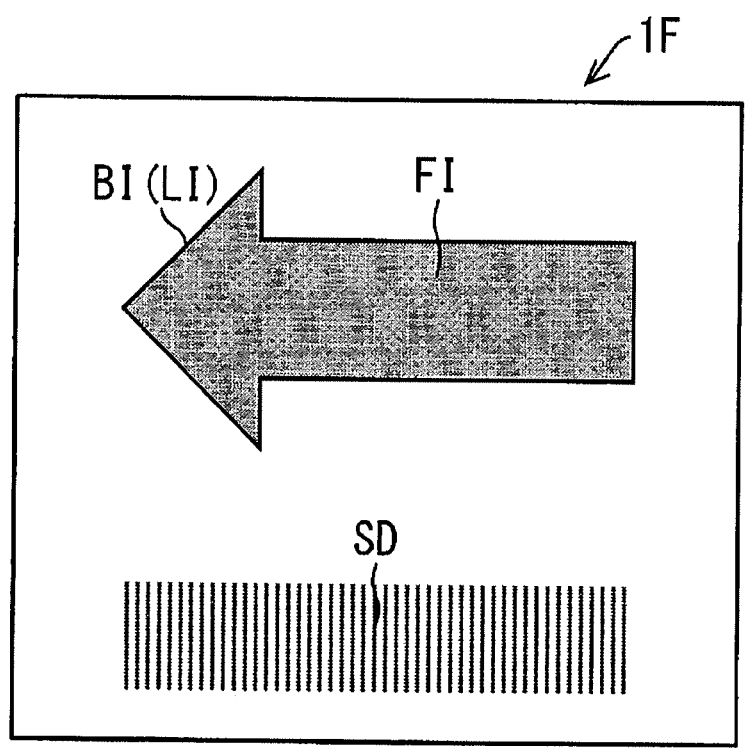
Figure 30A:
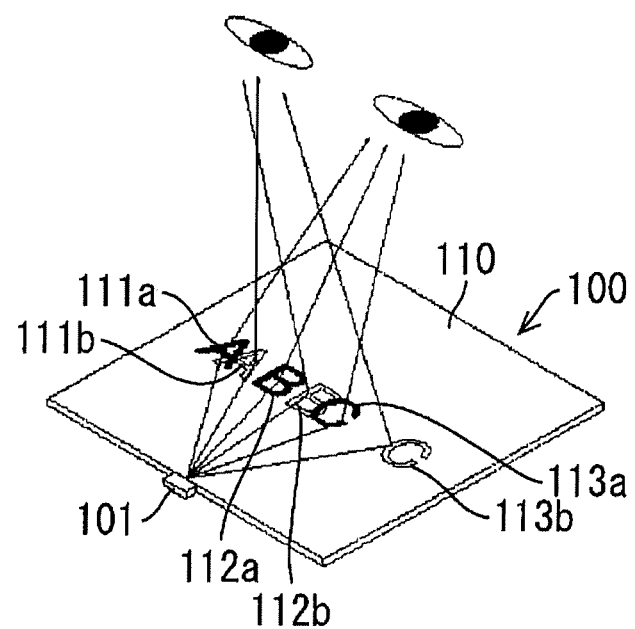
FIG. 30A through 30C illustrate configurations of an image display device serving as a conventional optical device.
Figure 30B:
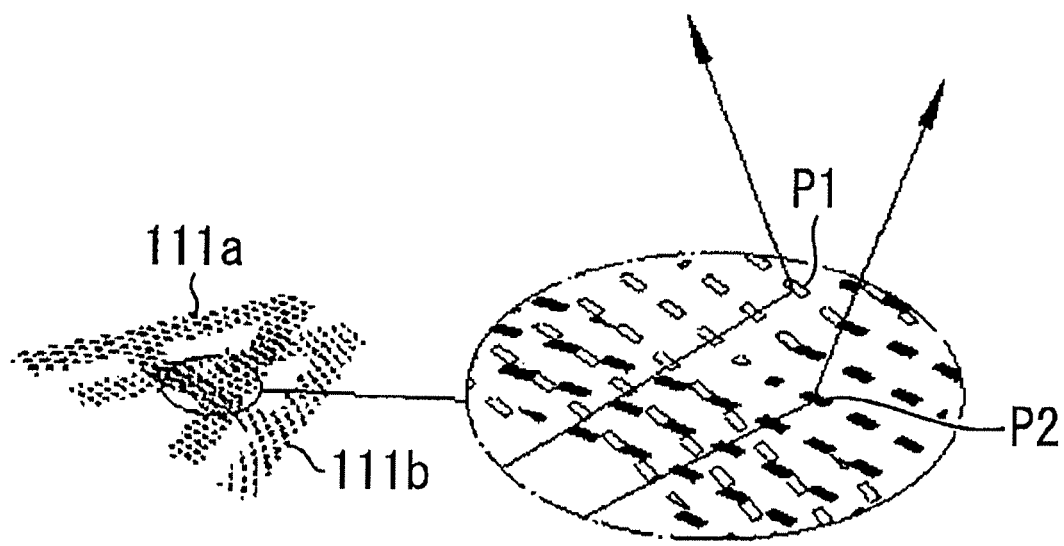
Figure 30C:
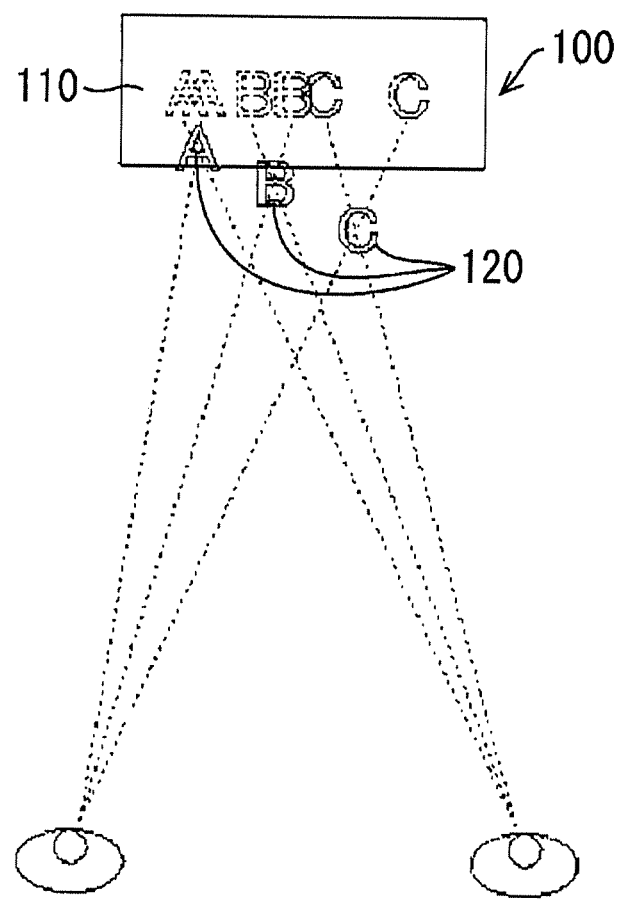

In addition to the features of the optical device 1A, the optical device 1F forms an outline image BI on at least one side of the planar image FI to correspond to a shadow SD of the planar image FI (FIGS. 29A and 29B).

That is, it is easier for a person to perceive three dimensionality when there is a shadow SD on an object.

Therefore, the optical device 1F forms a shadow SD for a planar image FI together with the planar image FI to make it easier to perceive the three dimensionality of the image.

Note that the shadow SD may be formed with the planar image FI or with the line image LI.

An optical device according to an aspect of the present invention is provided with a planar-image forming unit that emits light that forms a planar image of a predetermined shape in a space, and an outline-image forming unit that emits light that forms an outline image with a different light intensity than the planar image at the outer-edge region of the planar image.

Given the aforementioned configuration, the planar-image forming unit uses light emitted to form a planar image of a predetermined shape in a space, and the outline-image forming unit uses the light emitted to form an outline image with a different intensity than the planar image at the outer-age region of the planar image.

Therefore, even if by itself the border of a planar image is unclear, a planar image FI may appear more three-dimensional by forming an outline image with light having a different light intensity than that of the planar image as the border of the planar image.

An optical device that facilitates the perception of three dimensionality can therefore be provided.

In another aspect, the outline image forming unit in the optical device is constituted by an outline-image forming unit configured to form the outline image with a light intensity stronger than the light intensity of the planar image and to form the outline image as a line image that outlines the planar image.

Thus, an outline-image forming unit configured to form the line image can serve as an outline-image forming unit and form an outline image that has a stronger light intensity than that of the planar image. Therefore, the outline-image forming unit configured to form the line image can form a line image relative to the planar image, and that line image will have a stronger light intensity than that of the planar image.

As a result, an optical device 1A that facilitates perceiving three-dimensionality can be provided because the border of the planar image is formed with a line image having a greater light intensity.

In another aspect, the optical device with the aforementioned features may provide the planar image and the line image with different colors.

Hereby, the planar image may be formed with a to have a color, such as green, and the line image may be formed with white.

As a result, the color variation between the planar image and the line image allows three dimensionality to be easily obtained. The stereoscopic image is also easier to perceive.

In another aspect, the optical device with the aforementioned features may be configured so that the line image constituting an outline image is formed at the outer-edge region of the planar image; and a white outline image is formed outside the line image constituting the outline image.

Hereby, the outline image constituted by a line image is formed at the outer-edge region of the planar image, and additional white outline image is formed outside that outline image. Therefore, the blurring is no longer sensed when the outer-edge region of the planar image is blurred because the white outline image hides the blurred portion.

Consequently, this allows three dimensionality to be easily obtained, and facilitates perceiving the stereoscopic image. This also makes it possible to add a high-quality feel to stereoscopic image I.

In another aspect, the optical device with the aforementioned features may be configured so that the line image constituting an outline image is formed at the outer-edge region of the planar image; and the planar image and the outline image are formed with a gap therebetween.

Thus, outline image constituted by a line image, and the planar image are formed with a gap therebetween. This creates a dark area in the stereoscopic image between the planar image and the outline image constituted by the line image.

Consequently, this allows three dimensionality to be easily obtained. The stereoscopic image is also easy to perceive as a result of creating a dark area at the outer-edge region of the planar image.

In another aspect, the planar image formed by the planar-image forming unit has a pattern in the optical device with the aforementioned features.

Hereby, an optical device may be provided that is capable of forming a planar image with a pattern, e.g., stripes and thus texture. Hereby, the optical device provides a planar image where it is easier to perceive three dimensionality that with a solid planar image.

In another aspect, the optical device with the aforementioned features, an outline image is formed on at least one side of the planar image to correspond to a shadow for the planar image.

Therefore, an optical device may be provided that is capable of forming a shadow for a planar image together with the planar image to make it easier to perceive three dimensionality.

In another aspect, in the optical device with the aforementioned features the planar-image forming unit and the outline image forming unit each include: a light guide plate configured to direct light entering therein from a light source and emit light from an emission surface; and a plurality of optical-path deflectors arranged in the light guide plate and configured to change the optical path of light directed thereto causing the light emitted therefrom to form an image in a space; the plurality of optical-path deflectors including: a group of planar-image optical-path deflectors configured to change the optical path of light directed thereto, causing the light to exit therefrom and form the planar image in a space, and thereby to function as the planar-image forming unit; and including: a group of outline-image optical-path deflectors configured to change the optical path of light directed thereto, causing the light to exit therefrom and form the outline image in a space, and thereby to function as the outline-image forming unit.

Hereby, the optical device is configured from a light source from which light enters a light guide plate, and the light guide plate is equipped with a plurality of optical-path deflectors. The optical device thus has a simple configuration.

More specifically, in this aspect the plurality of optical-path deflectors including: a group of planar-image optical-path deflectors configured to change the optical path of light directed thereto, causing the light to exit therefrom and form the planar image in a space; and a group of outline-image optical-path deflectors configured to change the optical path of light directed thereto, causing the light to exit therefrom and form the outline image in a space.

Therefore, an optical device can be simply configured which facilitates stereoscopic vision. This is because the group of planar-image optical-path deflectors and the group of outline-image optical-path deflectors make up the plurality of optical-path deflectors.

In another aspect, in the optical device with the aforementioned features the group of outline-image optical-path deflectors is provided as a plurality of groups of second optical-path deflectors constituted by a plurality of second optical-path deflectors configured to form point images so that the point images appear to form the outline image as a line image.

Hereby, given that each of the second optical-path deflectors in the groups of second optical-path deflectors form a single point image, the single point image has a strong light intensity. Because there is a plurality of groups of second optical-path deflectors, the point images formed by the groups of second optical-path deflectors appear and are perceived as a line image when aligned.

Therefore, the groups of second optical-path deflectors which include a plurality of second optical-path deflectors may be provided as the optical path deflectors in the light guide plate for forming an image; hereby, the groups of second optical-path deflectors can easily produce the line image of strong light intensity that becomes the outline image.

In another aspect, in the optical device with the aforementioned features the group of planar-image optical-path deflectors is provided by groups of first optical-path deflectors including a plurality of first optical-path deflectors configured to form line images that appear to form the planar image.

Thus, the groups of first optical-path deflectors formed in the light guide plate and functioning as the optical-path deflectors can thereby form the line image that makes up a portion of the planar image. The plurality of groups of first optical-path deflectors therefore increases the thickness of the line image. Therefore, the line image appears to form a two-dimensional planar image.

The plurality of groups of first optical-path deflectors provided to serve as optical-path deflectors in the light guide plate therefore facilitates forming a two-dimensional planar image.

In another aspect, the group of planar-image optical-path deflectors in the optical device is constituted by a group of third optical-path deflectors configured to form the planar image from a parallax image.

Thus, the optical device may provide a planar image with a clear outline and facilitate the perception of three dimensionality even when the optical-path deflectors in the light guide plate are groups of third optical-path deflectors that use a parallax image to create the planar image.

In another aspect, in the optical device with the aforementioned features, the group of planar-image optical-path deflectors configured to form the planar image and the group of planar-image optical-path deflectors configured to form the outline image mutually differ by at least one of pattern shape and pattern size.

Hereby, the planar image and the outline image formed may be made mutually different.

In another aspect, in the optical device with the aforementioned features, the group of planar-image optical-path deflectors are configured so that the inner region and the outer-edge region of the planar image formed therewith have the same light intensity.

Hereby, there is a sharp change in light intensity between the outer-edge region and other regions of the planar image. Therefore, the shape of the planar image can be perceived even when the outer-edge region of the planar image is blurry.

In another aspect, in the optical device with the aforementioned features, reflection surfaces in the group of first optical-path deflectors constituting the group of planar-image optical-path deflectors are configured so that a greater proportion of the reflection surfaces form the outer-edge region of the planar image than the proportion of reflection surfaces configured to form the inner region of the planar image.

This configuration increases the light intensity in the outer-edge region of the planar image compared to the light intensity of the inner region.

Consequently, the inner and outer-edge regions of the planar image are formed with the same light intensity in the actual stereoscopic image.

In another aspect, in the optical device with the aforementioned features, the group of planar-image optical-path deflectors is configured to form a planar image with increased light intensity in regions other than the outer-edge region of the planar image to reduce the difference in light intensity between the regions other than the outer-edge region and the inner part of the planar image.

Hereby, the light intensity increases in regions other than the outer-edge regions of the planar image and introduces some blurring, thus improving the visibility of and imparting a high-quality feel to the stereoscopic image.

In another aspect, in the optical device with the aforementioned features, the group of planar-image optical-path deflectors is configured to form a planar image with increased light intensity in regions other than the outer-edge region of the planar image to create a singular point in a light intensity curve for the regions other than the outer-edge region of the planar image.

Thus, this creates a singular point in the regions other than the outer-edge region in the planar image; and, the light intensity at the location of the singular point changes sharply. Therefore, the shape of the planar image can be perceived even when the outer-edge region of the planar image is blurry.

A method of three-dimensional display according to an aspect of the present invention involves forming a planar image of a predetermined shape in a space, and forming an outline image with a different light intensity than the planar image at the outer-edge region of the planar image.

One aspect of the present invention provides for a method of three-dimensional display that makes it easy to perceive three dimensionality.

The present invention is not limited to each of the above described embodiments, and may be modified in various ways and remain within the scope of the claims. The technical means disclosed in each of the different embodiments may be combined as appropriate, and an embodiment obtained in such a manner remains within the technical scope of the present invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. An optical device comprising:
    a planar-image forming unit configured to emit light that forms a planar image of a predetermined shape in a space; and
    an outline-image forming unit configured to emit light that forms an outline image with a light intensity different from the light intensity of the planar image at an outer-edge region of the planar image,
    wherein the planar-image forming unit and the outline-image forming unit each include:
        a light guide plate configured to direct light entering therein from a light source and emit light from an emission surface, and
        a plurality of optical-path deflectors arranged in the light guide plate and configured to change an optical path of light directed thereto and causing light emitted therefrom to form an image in a space, and
    wherein the plurality of optical-path deflectors include:
        a group of planar-image optical-path deflectors configured to change the optical path of light directed thereto, causing the light to exit therefrom and form the planar image in a space, and thereby to function as the planar-image forming unit; and
        a group of outline-image optical-path deflectors configured to change the optical path of light directed thereto, causing the light to exit therefrom and form the outline image in a space, and thereby to function as the outline-image forming unit,
    wherein the group of planar-image optical-path deflectors is configured to form a planar image with increased light intensity in regions other than the outer-edge region of the planar image to reduce the difference in light intensity between the regions other than the outer-edge region and an inner part of the planar image.

2. The optical device according to claim 1, wherein the outline-image forming unit is configured to form the outline image with a light intensity stronger than the light intensity of the planar image and to form the outline image as a line image that outlines the planar image.

3. The optical device according to claim 2, wherein the planar image and the line image are mutually different colors.

4. The optical image device according to claim 2, wherein the line image constituting the outline image is formed at the outer-edge region of the planar image, and wherein a white outline image is formed outside the line image constituting the outline image.

5. The optical image device according to claim 2, wherein the line image constituting the outline image is formed at the outer-edge region of the planar image, and wherein the planar image and the outline image are formed with a gap therebetween.

6. The optical device according to claim 1, wherein the planar image formed by the planar-image forming unit has a pattern.

7. The optical device according to claim 1, wherein an outline image is formed on at least one side of the planar image to correspond to a shadow for the planar image.

8. The optical device according to claim 1, wherein the group of outline-image optical-path deflectors is provided as a plurality of groups of second optical-path deflectors constituted by a plurality of second optical-path deflectors configured to form point images so that the point images appear to form the outline image as a line image.

9. The optical device according to claim 1, wherein the group of planar-image optical-path deflectors is provided by groups of first optical-path deflectors including a plurality of first optical-path deflectors configured to form line images that appear to form the planar image.

10. The optical device according to claim 9, wherein, the group of planar-image optical-path deflectors are configured so that the inner region and the outer-edge region of the planar image formed therewith have a same light intensity.

11. The optical device according to claim 9, wherein reflection surfaces in the group of first optical-path deflectors constituting the group of planar-image optical-path deflectors are configured so that a greater proportion of the reflection surfaces form the outer-edge region of the planar image than the proportion of reflection surfaces configured to form the inner region of the planar image.

12. The optical device according to claim 1, wherein the group of planar-image optical-path deflectors is constituted by a group of third optical-path deflectors configured to form the planar image from a parallax image.

13. The optical device according to claim 1, wherein the group of planar-image optical-path deflectors configured to form the planar image and the group of planar-image optical-path deflectors configured to form the outline image mutually differ by at least one of pattern shape and pattern size.

14. The optical device according to claim 1, wherein the group of planar-image optical-path deflectors is configured to form a planar image with increased light intensity in regions other than the outer-edge region of the planar image to create a singular point in a light intensity curve for the regions other than the outer-edge region of the planar image.

15. A method of three-dimensional display with use of an optical device, the optical device comprising:
    a planar-image forming unit configured to emit light that forms a planar image of a predetermined shape in a space; and
    an outline-image forming unit configured to emit light that forms an outline image with a light intensity different from the light intensity of the planar image at an outer edge region of the planar image,
wherein the planar-image forming unit and the outline-image forming unit each comprising:
    a light guide plate configured to direct light entering therein from a light source and emit light from an emission surface, and
    a plurality of optical-path deflectors arranged in the light guide plate and configured to change an optical path of light directed thereto and causing light emitted therefrom to form an image in a space, and
wherein the plurality of optical-path deflectors comprises:
    a group of planar-image optical-path deflectors configured to change the optical path of light directed thereto, causing the light to exit therefrom and form the planar image in a space, and thereby to function as the planar-image forming unit; and
    a group of outline-image optical-path deflectors configured to change the optical path of light directed thereto, causing the light to exit therefrom and form the outline image in a space, and thereby to function as the outline-image forming unit,
the method comprising:
    causing the group of planar-image optical-path deflectors to form the planar image of the predetermined shape in the space, and
    causing the group of outline-image optical-path deflectors to form the outline image with a different light intensity than the planar image at the outer-edge region of the planar image,
    wherein the group of planar-image optical-path deflectors is configured to form the planar image with increased light intensity in regions other than the outer-edge region of the planar image to reduce the difference in light intensity between the regions other than the outer-edge region and an inner part of the planar image.

\* \* \* \* \*